(12) United States Patent
Antebi et al.

(10) Patent No.: US 9,361,444 B2
(45) Date of Patent: Jun. 7, 2016

(54) CARD FOR INTERACTION WITH A COMPUTER

(71) Applicant: Dialware Inc., Los Angeles, CA (US)

(72) Inventors: Amit Antebi, Ramat-Gan (IL); Alon Atsmon, Yahud (IL); Zvi Lev, Tel-Aviv (IL); Moshe Cohen, Tel-Aviv (IL)

(73) Assignee: Dialware Inc., Los Angeles, CA (US)

( * ) Notice: Subject to any disclaimer, the term of this patent is extended or adjusted under 35 U.S.C. 154(b) by 0 days.

(21) Appl. No.: 14/033,579

(22) Filed: Sep. 23, 2013

(65) Prior Publication Data

US 2014/0026213 A1 Jan. 23, 2014

Related U.S. Application Data

(60) Continuation of application No. 12/007,441, filed on Jan. 10, 2008, now Pat. No. 8,544,753, which is a division of application No. 09/806,789, filed as application No. PCT/IL99/00525 on Oct. 4, 1999, now (Continued)

(30) Foreign Application Priority Data

| Oct. 2, 1998 | (IL) | 126444 |
| Nov. 16, 1998 | (IL) | 127072 |
| Dec. 14, 1998 | (IL) | 127569 |

(51) Int. Cl.
*G06K 19/06* (2006.01)
*G06F 17/00* (2006.01)
(Continued)

(52) U.S. Cl.
CPC . *G06F 21/35* (2013.01); *G01S 5/22* (2013.01); *G01S 15/74* (2013.01); *G06K 19/0728* (2013.01); *G01S 7/003* (2013.01); *G01S 11/16* (2013.01)

(58) Field of Classification Search
CPC ..... G06K 19/00; G06K 19/067; G06K 19/07; G06K 19/0723; G06K 19/0728; G01S 7/003; G06F 21/34; G06F 21/35
USPC .......... 235/492, 375–382, 382.5, 487
See application file for complete search history.

(56) References Cited

U.S. PATENT DOCUMENTS 2,990,646 A 7/1961 Berger
3,885,089 A 5/1975 Callais et al.
(Continued)

FOREIGN PATENT DOCUMENTS

CA 2345736 4/2000
DE 19645071 5/1998
(Continued)

OTHER PUBLICATIONS

Communication Pursuant to Article 94(3) EPC Dated Oct. 15, 2013 From the European Patent Office Re. Application No. 12181255.6.
(Continued)

*Primary Examiner* — Thien M Le
*Assistant Examiner* — April Taylor
(74) *Attorney, Agent, or Firm* — Roach Brown McCarthy & Gruber, P.C.; Kevin D. McCarthy

(57) ABSTRACT

A smart card comprising:
a memory for storing information;
at least one transmitting or receiving antenna; and
a low frequency circuit, for handling information associated with said antenna and said memory, which information is modulated at a modulation frequency of between 5 kHz and 100 kHz. Preferably the antenna is an acoustic antenna.

12 Claims, 5 Drawing Sheets

Related U.S. Application Data

Pat. No. 7,334,735, and a continuation-in-part of application No. PCT/IL99/00521, filed on Oct. 1, 1999, and a continuation-in-part of application No. PCT/IL99/00506, filed on Sep. 16, 1999, and a continuation-in-part of application No. PCT/IL99/00470, filed on Aug. 27, 1999.

(60) Provisional application No. 60/153,858, filed on Sep. 14, 1999, provisional application No. 60/145,342, filed on Jul. 23, 1999, provisional application No. 60/143,220, filed on Jul. 9, 1999, provisional application No. 60/122,687, filed on Mar. 3, 1999, provisional application No. 60/115,231, filed on Jan. 8, 1999.

(51) Int. Cl.
*G06K 5/00* (2006.01)
*G06F 21/35* (2013.01)
*G01S 5/22* (2006.01)
*G01S 15/74* (2006.01)
*G06K 19/07* (2006.01)
*G01S 7/00* (2006.01)
*G01S 11/16* (2006.01)

(56) References Cited

U.S. PATENT DOCUMENTS

| | | |
|---|---|---|
| 3,961,323 A | 6/1976 | Hartkorn |
| 4,207,696 A | 6/1980 | Hyman et al. |
| 4,231,184 A | 11/1980 | Corris et al. |
| 4,264,978 A | 4/1981 | Whidden |
| 4,335,183 A | 6/1982 | Hosaka |
| 4,353,064 A | 10/1982 | Stamm |
| 4,390,877 A | 6/1983 | Curran |
| 4,479,995 A | 10/1984 | Suzuki et al. |
| 4,612,472 A | 9/1986 | Kakizaki et al. |
| 4,614,861 A | 9/1986 | Pavlov et al. |
| 4,637,007 A | 1/1987 | Sakurai |
| 4,640,034 A | 2/1987 | Zisholtz |
| 4,641,374 A | 2/1987 | Oyama |
| 4,670,746 A | 6/1987 | Taniguchi et al. |
| 4,673,371 A | 6/1987 | Furukawa |
| 4,677,657 A | 6/1987 | Nagata et al. |
| 4,682,370 A | 7/1987 | Matthews |
| 4,696,653 A | 9/1987 | McKeefery |
| 4,716,376 A | 12/1987 | Daudelin |
| 4,717,364 A | 1/1988 | Furukawa |
| 4,739,398 A | 4/1988 | Thomas et al. |
| 4,764,666 A | 8/1988 | Bergeron |
| 4,766,294 A | 8/1988 | Nara et al. |
| 4,814,591 A | 3/1989 | Nara et al. |
| 4,818,855 A | 4/1989 | Mongeon et al. |
| 4,840,602 A | 6/1989 | Rose |
| 4,851,654 A | 7/1989 | Nitta |
| 4,857,030 A | 8/1989 | Rose |
| 4,874,935 A | 10/1989 | Younger |
| 4,894,663 A | 1/1990 | Urbish et al. |
| 4,918,416 A | 4/1990 | Walton et al. |
| 4,924,075 A | 5/1990 | Tanaka |
| 4,931,623 A * | 6/1990 | Nakamura et al. ............ 235/488 |
| 4,935,907 A | 6/1990 | Friedman |
| 4,942,534 A | 7/1990 | Yokoyama et al. |
| 4,961,229 A | 10/1990 | Takahashi |
| 4,973,286 A | 11/1990 | Davison |
| 4,978,840 A | 12/1990 | Anegawa |
| 4,984,380 A | 1/1991 | Anderson |
| 5,032,099 A | 7/1991 | Chan |
| 5,072,103 A | 12/1991 | Nara |
| 5,085,610 A | 2/1992 | Engel et al. |
| 5,142,508 A | 8/1992 | Mitchell et al. |
| 5,176,560 A | 1/1993 | Wetherell et al. |
| 5,191,615 A | 3/1993 | Aldava et al. |
| 5,209,695 A | 5/1993 | Rothschild |
| 5,241,160 A | 8/1993 | Bashan et al. |
| 5,280,267 A | 1/1994 | Reggiani |
| 5,280,527 A | 1/1994 | Gullman et al. |
| 5,289,273 A | 2/1994 | Lang |
| 5,307,051 A | 4/1994 | Sedlmayr |
| 5,314,336 A | 5/1994 | Diamond et al. |
| 5,317,138 A * | 5/1994 | Togawa ........................ 235/440 |
| 5,317,636 A | 5/1994 | Vizcaino |
| 5,324,038 A | 6/1994 | Sasser |
| 5,333,171 A | 7/1994 | Wang et al. |
| 5,356,326 A | 10/1994 | Ting |
| 5,376,778 A | 12/1994 | Kreft |
| 5,407,376 A | 4/1995 | Avital et al. |
| 5,412,253 A | 5/1995 | Hough |
| 5,416,829 A | 5/1995 | Umemoto |
| 5,420,606 A | 5/1995 | Begum et al. |
| 5,423,073 A | 6/1995 | Ogawa |
| 5,426,979 A | 6/1995 | Kantorovich et al. |
| 5,434,395 A * | 7/1995 | Storck et al. .................. 235/380 |
| 5,434,398 A | 7/1995 | Goldberg |
| H1469 H | 8/1995 | Simonoff |
| 5,452,901 A | 9/1995 | Nakada et al. |
| 5,467,095 A | 11/1995 | Rodal et al. |
| 5,479,408 A | 12/1995 | Will |
| 5,481,535 A | 1/1996 | Hershey |
| 5,492,290 A | 2/1996 | Quinn et al. |
| 5,511,122 A | 4/1996 | Atkinson |
| 5,517,194 A | 5/1996 | Carroll et al. |
| 5,522,089 A | 5/1996 | Kikinis et al. |
| 5,522,623 A | 6/1996 | Soules et al. |
| 5,523,749 A | 6/1996 | Cole et al. |
| 5,539,819 A | 7/1996 | Sonoyama et al. |
| 5,552,790 A | 9/1996 | Gunnarsson |
| 5,579,537 A | 11/1996 | Takahisa |
| 5,583,933 A | 12/1996 | Mark |
| 5,585,787 A * | 12/1996 | Wallerstein .................. 340/5.42 |
| 5,590,038 A | 12/1996 | Pitroda |
| 5,598,187 A | 1/1997 | Ide et al. |
| 5,606,732 A | 2/1997 | Vignone, Sr. |
| 5,615,111 A | 3/1997 | Raskas et al. |
| 5,623,552 A | 4/1997 | Lane |
| 5,629,867 A | 5/1997 | Goldman |
| 5,629,981 A | 5/1997 | Nerlikar |
| 5,635,701 A | 6/1997 | Gloton |
| 5,638,047 A | 6/1997 | Orloff et al. |
| 5,638,450 A | 6/1997 | Robson |
| 5,640,003 A | 6/1997 | Makino |
| 5,646,907 A | 7/1997 | Maccabee |
| 5,647,787 A | 7/1997 | Raviv et al. |
| 5,647,834 A | 7/1997 | Ron |
| 5,655,945 A | 8/1997 | Jani |
| 5,697,829 A | 12/1997 | Chainani et al. |
| 5,698,836 A | 12/1997 | Fujioka |
| 5,706,031 A | 1/1998 | Brendzel et al. |
| 5,708,853 A | 1/1998 | Sanemitsu |
| 5,717,168 A | 2/1998 | Debuisser et al. |
| 5,719,387 A | 2/1998 | Fujioka |
| 5,731,757 A | 3/1998 | Layson, Jr. |
| 5,740,232 A | 4/1998 | Pailles et al. |
| 5,742,677 A | 4/1998 | Pinder et al. |
| 5,745,555 A | 4/1998 | Mark |
| 5,745,591 A | 4/1998 | Feldman |
| 5,746,602 A | 5/1998 | Kikinis |
| 5,752,880 A | 5/1998 | Gabai et al. |
| 5,761,606 A | 6/1998 | Wolzien |
| 5,763,862 A | 6/1998 | Jachimowicz et al. |
| 5,764,512 A | 6/1998 | Michel et al. |
| 5,764,763 A | 6/1998 | Jensen et al. |
| 5,764,900 A | 6/1998 | Morris et al. |
| 5,768,686 A | 6/1998 | LeBlanc et al. |
| 5,774,791 A | 6/1998 | Strohallen et al. |
| 5,778,071 A | 7/1998 | Caputo et al. |
| 5,778,187 A | 7/1998 | Monteiro et al. |
| 5,786,764 A | 7/1998 | Engellenner |
| 5,786,988 A | 7/1998 | Harari |
| 5,789,733 A | 8/1998 | Jachimowicz et al. |
| 5,793,305 A | 8/1998 | Turner et al. |
| 5,800,243 A | 9/1998 | Berman |
| 5,802,167 A | 9/1998 | Hong |

(56) References Cited

U.S. PATENT DOCUMENTS

| | | |
|---|---|---|
| 5,805,676 A | 9/1998 | Martino |
| 5,809,245 A | 9/1998 | Zenda |
| 5,815,020 A | 9/1998 | Allen et al. |
| 5,817,207 A | 10/1998 | Leighton |
| 5,818,030 A | 10/1998 | Reyes |
| 5,825,871 A | 10/1998 | Mark |
| 5,831,520 A | 11/1998 | Stephan |
| 5,832,424 A | 11/1998 | Tsutsui |
| 5,847,662 A | 12/1998 | Yokota et al. |
| 5,847,752 A | 12/1998 | Sebestyen |
| 5,850,077 A | 12/1998 | Tognazzini |
| 5,854,589 A | 12/1998 | How et al. |
| 5,859,913 A | 1/1999 | Goreta et al. |
| 5,861,841 A | 1/1999 | Gildea et al. |
| 5,862,491 A | 1/1999 | Nair et al. |
| 5,864,794 A | 1/1999 | Tasaki |
| 5,870,155 A | 2/1999 | Erlin |
| 5,877,748 A | 3/1999 | Redlich |
| 5,878,142 A | 3/1999 | Caputo et al. |
| 5,880,769 A | 3/1999 | Nemirofsky et al. |
| 5,881,149 A | 3/1999 | Weatherill |
| 5,884,271 A | 3/1999 | Pitroda |
| 5,892,418 A | 4/1999 | Onishi et al. |
| 5,903,721 A | 5/1999 | Sixtus |
| 5,905,246 A | 5/1999 | Fajkowski |
| 5,905,865 A | 5/1999 | Palmer et al. |
| 5,907,142 A | 5/1999 | Kelsey |
| 5,914,980 A | 6/1999 | Yokota et al. |
| 5,921,674 A | 7/1999 | Koczi |
| 5,928,292 A | 7/1999 | Miller et al. |
| 5,949,492 A | 9/1999 | Mankovitz |
| 5,949,772 A | 9/1999 | Sugikawa et al. |
| 5,955,961 A | 9/1999 | Wallerstein |
| 5,963,643 A | 10/1999 | Goreta et al. |
| 5,982,762 A | 11/1999 | Anzai et al. |
| 5,986,562 A | 11/1999 | Nikolich |
| 5,987,509 A | 11/1999 | Portuesi |
| 6,005,548 A | 12/1999 | Latypov et al. |
| 6,009,151 A | 12/1999 | Staples |
| 6,010,074 A | 1/2000 | Kelly et al. |
| 6,014,083 A | 1/2000 | Bauerschmidt et al. |
| 6,016,476 A | 1/2000 | Maes et al. |
| 6,018,641 A | 1/2000 | Tsubouchi et al. |
| 6,019,285 A | 2/2000 | Isobe et al. |
| 6,021,119 A | 2/2000 | Derks et al. |
| 6,023,509 A | 2/2000 | Herbert et al. |
| 6,023,779 A | 2/2000 | Fullam et al. |
| 6,036,099 A | 3/2000 | Leighton |
| 6,055,592 A | 4/2000 | Smith |
| 6,058,373 A | 5/2000 | Blinn et al. |
| 6,060,332 A | 5/2000 | Martin |
| 6,068,192 A | 5/2000 | McCabe et al. |
| 6,079,621 A | 6/2000 | Vardanyan et al. |
| 6,081,782 A | 6/2000 | Rabin |
| 6,089,942 A | 7/2000 | Chan |
| 6,097,292 A | 8/2000 | Kelly et al. |
| 6,098,106 A | 8/2000 | Philyaw et al. |
| 6,110,000 A | 8/2000 | Ting |
| 6,119,228 A | 9/2000 | Angelo et al. |
| 6,122,312 A | 9/2000 | Shiro |
| 6,125,172 A | 9/2000 | August et al. |
| 6,125,452 A | 9/2000 | Kuriyama |
| 6,131,042 A | 10/2000 | Lee et al. |
| 6,144,114 A | 11/2000 | Chutorash |
| 6,149,490 A | 11/2000 | Hampton et al. |
| 6,163,616 A | 12/2000 | Feldman |
| 6,169,617 B1 * | 1/2001 | Tsuchiya ............ G06K 19/0723 398/115 |
| 6,176,837 B1 | 1/2001 | Foxlin |
| 6,182,044 B1 | 1/2001 | Fong et al. |
| 6,186,396 B1 | 2/2001 | Crandall, Jr. |
| 6,189,096 B1 | 2/2001 | Haverty |
| 6,194,993 B1 | 2/2001 | Hayashi et al. |
| 6,195,693 B1 | 2/2001 | Berry et al. |
| 6,202,926 B1 | 3/2001 | Ito et al. |
| 6,211,858 B1 | 4/2001 | Moon et al. |
| 6,222,880 B1 | 4/2001 | Eastmond et al. |
| 6,226,677 B1 | 5/2001 | Slemmer |
| 6,233,736 B1 | 5/2001 | Wolzien |
| 6,236,724 B1 | 5/2001 | Labaton et al. |
| 6,237,026 B1 | 5/2001 | Prasad et al. |
| 6,244,260 B1 | 6/2001 | Ragoza et al. |
| 6,248,946 B1 | 6/2001 | Dwek |
| 6,256,298 B1 | 7/2001 | Nakajo |
| 6,257,486 B1 | 7/2001 | Teicher et al. |
| 6,263,218 B1 | 7/2001 | Kita |
| 6,272,228 B1 | 8/2001 | Martin |
| 6,278,993 B1 | 8/2001 | Kumar et al. |
| 6,282,522 B1 | 8/2001 | Davis et al. |
| 6,284,406 B1 | 9/2001 | Xing et al. |
| 6,289,114 B1 | 9/2001 | Mainguet |
| 6,292,437 B1 | 9/2001 | Beard |
| 6,301,312 B1 | 10/2001 | Limberg |
| 6,308,890 B1 * | 10/2001 | Cooper .................. G06K 19/06 235/449 |
| 6,309,275 B1 | 10/2001 | Fong et al. |
| 6,315,195 B1 * | 11/2001 | Ramachandran ............ 235/380 |
| 6,331,972 B1 | 12/2001 | Harris et al. |
| 6,332,163 B1 | 12/2001 | Bowman-Amuah |
| 6,345,766 B1 | 2/2002 | Taskett et al. |
| 6,360,953 B1 | 3/2002 | Lin et al. |
| 6,377,670 B1 | 4/2002 | Rosset et al. |
| 6,380,844 B2 | 4/2002 | Pelekis |
| 6,382,516 B1 | 5/2002 | King |
| 6,385,314 B1 | 5/2002 | Furuya |
| 6,389,055 B1 | 5/2002 | August et al. |
| 6,389,935 B1 | 5/2002 | Azima et al. |
| 6,392,960 B1 | 5/2002 | Seltzer et al. |
| 6,393,126 B1 | 5/2002 | Van der Kaay et al. |
| 6,394,343 B1 * | 5/2002 | Berg et al. ..................... 235/379 |
| 6,400,996 B1 | 6/2002 | Hoffberg et al. |
| 6,404,877 B1 | 6/2002 | Bolduc et al. |
| 6,421,453 B1 | 7/2002 | Kanevsky et al. |
| 6,442,510 B1 | 8/2002 | Klefenz |
| 6,445,780 B1 | 9/2002 | Rosset et al. |
| 6,481,623 B1 * | 11/2002 | Grant et al. .................. 235/449 |
| 6,487,421 B2 | 11/2002 | Hess et al. |
| 6,513,015 B2 | 1/2003 | Ogasawara |
| 6,516,416 B2 | 2/2003 | Gregg et al. |
| 6,519,564 B1 | 2/2003 | Hoffberg et al. |
| 6,547,130 B1 | 4/2003 | Shen |
| 6,556,768 B1 | 4/2003 | Nakajima et al. |
| 6,556,965 B1 | 4/2003 | Borland et al. |
| 6,559,755 B1 | 5/2003 | Hamamoto et al. |
| 6,570,490 B1 | 5/2003 | Saitoh et al. |
| 6,573,883 B1 | 6/2003 | Bartlett |
| 6,594,052 B2 | 7/2003 | Hiramatsu et al. |
| 6,607,136 B1 * | 8/2003 | Atsmon et al. ................ 235/492 |
| 6,628,240 B2 | 9/2003 | Amadeo |
| 6,641,374 B2 | 11/2003 | Kim |
| 6,647,063 B1 | 11/2003 | Oikawa |
| 6,648,719 B2 | 11/2003 | Chan |
| 6,661,563 B2 | 12/2003 | Hayashi et al. |
| 6,681,008 B2 | 1/2004 | Bolduc et al. |
| 6,704,715 B1 | 3/2004 | Rosset et al. |
| 6,708,892 B2 | 3/2004 | Smith, II |
| 6,754,641 B2 | 6/2004 | Kolls |
| 6,758,404 B2 | 7/2004 | Ladyansky |
| 6,760,276 B1 | 7/2004 | Karr |
| 6,764,005 B2 * | 7/2004 | Cooper .................. G06K 19/06 235/449 |
| 6,765,996 B2 | 7/2004 | Baxter et al. |
| 6,766,946 B2 | 7/2004 | Lida et al. |
| RE38,600 E | 9/2004 | Mankovitz |
| 6,804,778 B1 | 10/2004 | Levi et al. |
| 6,823,452 B1 | 11/2004 | Doyle et al. |
| 6,834,111 B1 | 12/2004 | Nishimura et al. |
| 6,853,731 B1 | 2/2005 | Boyle et al. |
| 6,873,974 B1 | 3/2005 | Schutzer |
| 6,934,848 B1 | 8/2005 | King et al. |
| 6,963,842 B2 | 11/2005 | Goodwin |
| 6,973,426 B1 | 12/2005 | Schier et al. |
| 6,976,164 B1 | 12/2005 | King et al. |
| 6,982,649 B2 | 1/2006 | Blum et al. |

(56) References Cited

U.S. PATENT DOCUMENTS

| | | | |
|---|---|---|---|
| 6,990,334 B1 | 1/2006 | Ito | |
| 7,013,301 B2 | 3/2006 | Holm et al. | |
| 7,058,376 B2 | 6/2006 | Logan et al. | |
| 7,072,476 B2 | 7/2006 | White et al. | |
| 7,080,253 B2 | 7/2006 | Weare | |
| 7,095,450 B1 | 8/2006 | Holmes et al. | |
| 7,103,575 B1 | 9/2006 | Linehan | |
| 7,159,153 B2 | 1/2007 | Kim | |
| 7,183,929 B1 | 2/2007 | Antebi et al. | |
| 7,260,221 B1 | 8/2007 | Atsmon | |
| 7,280,970 B2 | 10/2007 | Tamir et al. | |
| 7,318,049 B2 | 1/2008 | Iannacci | |
| 7,334,735 B1 | 2/2008 | Antebi et al. | |
| 7,343,619 B2 | 3/2008 | Ofek et al. | |
| 7,379,901 B1 | 5/2008 | Philyaw | |
| 7,437,560 B1 | 10/2008 | Page et al. | |
| 7,451,114 B1 | 11/2008 | Matsuda et al. | |
| 7,493,283 B1 | 2/2009 | Philyaw | |
| 7,565,294 B2 | 7/2009 | Rhoads | |
| 7,568,963 B1 * | 8/2009 | Atsmon et al. | 446/175 |
| 7,643,850 B2 | 1/2010 | Thijssen et al. | |
| 7,706,838 B2 | 4/2010 | Atsmon et al. | |
| 7,716,662 B2 | 5/2010 | Seiden | |
| 7,760,919 B2 | 7/2010 | Namgoong | |
| 7,765,373 B1 | 7/2010 | Merry et al. | |
| 7,818,423 B1 | 10/2010 | Philyaw | |
| 7,930,213 B1 | 4/2011 | Philyaw et al. | |
| 8,019,609 B2 | 9/2011 | Tamir et al. | |
| 8,078,136 B2 | 12/2011 | Atsmon et al. | |
| 8,311,516 B2 | 11/2012 | Kim et al. | |
| 8,509,680 B2 | 8/2013 | Atsmon et al. | |
| 2001/0047486 A1 | 11/2001 | Green et al. | |
| 2001/0055202 A1 | 12/2001 | Templeton et al. | |
| 2002/0016858 A1 | 2/2002 | Sawada et al. | |
| 2002/0019939 A1 | 2/2002 | Yamamoto et al. | |
| 2002/0097467 A1 | 7/2002 | Terahara et al. | |
| 2002/0112171 A1 | 8/2002 | Ginter et al. | |
| 2002/0156917 A1 | 10/2002 | Nye | |
| 2002/0157034 A1 | 10/2002 | Sagar | |
| 2002/0162023 A1 | 10/2002 | Audebert et al. | |
| 2002/0169608 A1 | 11/2002 | Tamir et al. | |
| 2002/0172193 A1 | 11/2002 | Preston et al. | |
| 2003/0006901 A1 | 1/2003 | Kim et al. | |
| 2003/0010190 A1 | 1/2003 | Sammut et al. | |
| 2003/0067908 A1 | 4/2003 | Mattaway et al. | |
| 2003/0074569 A1 | 4/2003 | Yamauchi et al. | |
| 2003/0111527 A1 | 6/2003 | Blossom | |
| 2003/0147547 A1 | 8/2003 | Lin et al. | |
| 2003/0159040 A1 | 8/2003 | Hashimoto et al. | |
| 2004/0031856 A1 | 2/2004 | Atsmon et al. | |
| 2004/0053642 A1 | 3/2004 | Sandberg et al. | |
| 2004/0069846 A1 | 4/2004 | Lambert | |
| 2004/0130442 A1 | 7/2004 | Breed et al. | |
| 2004/0220807 A9 | 11/2004 | Tamir et al. | |
| 2004/0236819 A1 | 11/2004 | Anati et al. | |
| 2004/0260556 A1 | 12/2004 | Hoffberg et al. | |
| 2005/0044561 A1 | 2/2005 | McDonald | |
| 2005/0053122 A1 | 3/2005 | Barclay | |
| 2005/0059341 A1 | 3/2005 | Damaghi | |
| 2005/0172137 A1 | 8/2005 | Hopkins | |
| 2005/0234826 A1 | 10/2005 | Ohmori et al. | |
| 2006/0136544 A1 | 6/2006 | Atsmon et al. | |
| 2006/0229114 A2 | 10/2006 | Kim | |
| 2006/0271646 A1 | 11/2006 | Janky et al. | |
| 2006/0279542 A1 | 12/2006 | Flack et al. | |
| 2006/0288374 A1 | 12/2006 | Ferris et al. | |
| 2007/0047846 A1 | 3/2007 | Li et al. | |
| 2007/0063025 A1 | 3/2007 | Blossom | |
| 2007/0112565 A1 | 5/2007 | Kim et al. | |
| 2007/0112566 A1 | 5/2007 | Chen | |
| 2007/0135984 A1 | 6/2007 | Breed et al. | |
| 2007/0223705 A1 | 9/2007 | Kasahara et al. | |
| 2008/0014989 A1 | 1/2008 | Sandegard et al. | |
| 2008/0034410 A1 | 2/2008 | Udupa et al. | |
| 2008/0071537 A1 | 3/2008 | Tamir et al. | |
| 2008/0072072 A1 | 3/2008 | Muraki et al. | |
| 2008/0152137 A1 | 6/2008 | Nakano et al. | |
| 2008/0167106 A1 | 7/2008 | Lutnick et al. | |
| 2008/0173717 A1 | 7/2008 | Antebi et al. | |
| 2009/0006729 A1 | 1/2009 | Piazza et al. | |
| 2009/0036188 A1 | 2/2009 | Gelman | |
| 2009/0137269 A1 | 5/2009 | Chung | |
| 2009/0175318 A1 | 7/2009 | Koenck et al. | |
| 2009/0184884 A1 | 7/2009 | Kyou et al. | |
| 2009/0204998 A1 | 8/2009 | McDaniel et al. | |
| 2009/0264205 A1 | 10/2009 | Atsmon et al. | |
| 2010/0030838 A1 | 2/2010 | Atsmon et al. | |
| 2010/0162122 A1 | 6/2010 | Mikan et al. | |
| 2010/0210264 A1 | 8/2010 | Netanel et al. | |
| 2010/0211431 A1 | 8/2010 | Lutnick et al. | |
| 2010/0223120 A1 | 9/2010 | Dragt | |
| 2010/0227590 A1 | 9/2010 | Kim et al. | |
| 2010/0256976 A1 | 10/2010 | Atsmon et al. | |
| 2011/0321149 A1 | 12/2011 | Tamir et al. | |
| 2012/0058705 A1 | 3/2012 | Atsmon et al. | |
| 2012/0151515 A1 | 6/2012 | Atsmon et al. | |
| 2013/0005447 A1 | 1/2013 | Lutnick et al. | |
| 2013/0006773 A1 | 1/2013 | Lutnick et al. | |
| 2013/0073744 A1 | 3/2013 | Ratica | |
| 2013/0080238 A1 | 3/2013 | Kelly et al. | |
| 2013/0218571 A1 | 8/2013 | Tamir et al. | |
| 2013/0244531 A1 | 9/2013 | Atsmon et al. | |
| 2013/0332355 A1 | 12/2013 | Atsmon et al. | |
| 2014/0154969 A1 | 6/2014 | Atsmon et al. | |
| 2014/0179432 A1 | 6/2014 | Cohen et al. | |

FOREIGN PATENT DOCUMENTS

| | | |
|---|---|---|
| EP | 0526015 | 2/1993 |
| EP | 0789320 | 8/1997 |
| EP | 0872995 | 10/1998 |
| EP | 0933733 | 8/1999 |
| EP | 1065634 | 1/2001 |
| FR | 2790849 | 9/2000 |
| GB | 2236258 | 4/1991 |
| JP | 62-060076 | 3/1987 |
| JP | 01-226091 | 9/1989 |
| JP | 07-087234 | 3/1995 |
| WO | WO 93/11619 | 6/1993 |
| WO | WO 93/21720 | 10/1993 |
| WO | WO 94/17498 | 8/1994 |
| WO | WO 96/10880 | 4/1996 |
| WO | WO 97/15899 | 5/1997 |
| WO | WO 97/16049 | 5/1997 |
| WO | WO 98/12670 | 3/1998 |
| WO | WO 98/57474 | 12/1998 |
| WO | WO 99/22362 | 5/1999 |
| WO | WO 99/23804 | 5/1999 |
| WO | WO 00/01456 | 1/2000 |
| WO | WO 00/15316 | 3/2000 |
| WO | WO 00/21020 | 4/2000 |
| WO | WO 00/21203 | 4/2000 |
| WO | WO 00/29920 | 5/2000 |
| WO | WO 00/77751 | 12/2000 |
| WO | WO 01/08110 | 2/2001 |
| WO | WO 01/82223 | 11/2001 |
| WO | WO 02/14974 | 2/2002 |
| WO | WO 02/076717 | 10/2002 |
| WO | WO 02/078199 | 10/2002 |

OTHER PUBLICATIONS

Notice of Allowance Dated Oct. 17, 2013 From the U.S. Appl. No. 12/903,240.
Official Action Dated Oct. 8, 2013 From the U.S. Appl. No. 13/964,208.
Official Action Dated Feb. 4, 2014 From the U.S. Appl. No. 13/964,208.
Official Action Dated Mar. 18, 2014 From the U.S. Appl. No. 13/867,173.
Official Action Dated May 2, 2014 From the U.S. Appl. No. 12/903,240.
Official Action Dated Dec. 17, 2013 From the U.S. Appl. No. 13/083,643.

(56) References Cited

OTHER PUBLICATIONS

Final Official Action Dated Mar. 5, 2014 From the U.S. Appl. No. 13/083,643.
Advisory Action Before Filing of an Appeal Brief Dated Jul. 9, 2013 From the U.S. Appl. No. 12/079,000.
Applicant-Initiated Interview Summary Dated May 22, 2013 From the US Patent and Trademark Office Re. U.S. Appl. No. 12/079,000.
Communication Pursuant to Article 94(3) EPC Dated Jan. 2, 2013 From the European Patent Office Re. Application No. 01908897.0.
Communication Pursuant to Article 94(3) EPC Dated Aug. 18, 2010 From the European Patent Office Re. Application No. 01908897.0.
Communication Pursuant to Article 94(3) EPC Dated Jan. 20, 2012 From the European Patent Office Re. Application No. 02718485.2.
Communication Pursuant to Article 94(3) EPC Dated Mar. 25, 2011 From the European Patent Office Re. Application No. 02718485.2.
Communications Pursuant to Rules 70(2) and 70a(2) EPC and Reference to Rule 39(1) EPC Dated Dec. 10, 2012 From the European Patent Office Re. Application No. 12181255.6.
European Search Report and the European Search Opinion Dated Nov. 5, 2012 From the European Patent Office Re. Application No. 12181255.6.
International Preliminary Examination Report Dated Dec. 4, 2003 From the International Preliminary Examining Authority of the Patent Cooperation Authority Re.: Application No. PCT/IL01/00758.
International Preliminary Examination Report Dated Mar. 21, 2001 From the International Preliminary Examining Authority of the Patent Cooperation Authority Re.: Application No. PCT/IL99/00525.
International Search Report Dated Dec. 3, 2002 from the International Searching Authority of the Patent Cooperation Treaty Re.: Application No. PCT/IL02/00236.
International Search Report Dated Apr. 4, 2000 From the International Searching authority of the Patent Cooperation Treaty Re.: Application No. PCT/IL99/00525.
International Search Report Dated Jul. 5, 2000 From the International Searching Authority of the Patent Cooperation Treaty Re.: Application No. PCT/IB99/02110.
International Search Report Dated Dec. 9, 2002 From the International Searching Authority of the Patent Cooperation Treaty Re.: Application No. PCT/US02/90342.
International Search Report Dated Feb. 17, 2000 From the International Searching Authority of the Patent Cooperation Treaty Re.: Application No. PCT/IL99/00521.
International Search Report Dated Jul. 21, 2000 From the International Searching Authority of the Patent Cooperation Treaty Re.: Application No. PCT/IL99/00506.
International Search Report Dated Mar. 25, 1999 From the International Searching Authority of the Patent Cooperation Treaty Re.: Application No. PCT/IL98/00450.
International Search Report Dated Mar. 26, 2002 From the International Searching Authority of the Patent Cooperation Treaty Re.: Application No. PCT/IL01/00758.
International Search Report Dated Sep. 28, 2000 From the International Searching Authority of the Patent Cooperation Treaty Re.: Application No. PCT/IL99/00525.
Invitation Pursuant to Article 94(3) and Rule 71(1) EPC Dated May 24, 2013 From the European Patent Office Re. Application No. 02718485.2.
Notice of Allowance Dated Jan. 2, 2008 from the US Patent and Trademark Office Re.: U.S. Appl. No. 09/806,618.
Notice of Allowance Dated Jun. 4, 2007 From the US Patent and Trademark Office Re.: U.S. Appl. No. 09/853,017.
Notice of Allowance Dated Oct. 4, 2007 From the US Patent and Trademark Office Re.: U.S. Appl. No. 09/806,789.
Notice of Allowance Dated Apr. 5, 2013 From the US Patent and Trademark Office Re.: U.S. Appl. No. 13/316,710.
Notice of Allowance Dated Aug. 5, 2008 From the US Patent and Trademark Office Re.: U.S. Appl. No. 11/339,275.
Notice of Allowance Dated Jun. 7, 2005 From the US Patent and Trademark Office Re.: U.S. Appl. No. 09/806,618.
Notice of Allowance Dated Nov. 8, 2012 From the US Patent and Trademark Office Re.: U.S. Appl. No. 13/229,784.
Notice of Allowance Dated Aug. 9, 2011 From the US Patent and Trademark Office Re.: U.S. Appl. No. 12/752,181.
Notice of Allowance Dated Dec. 11, 2009 From the US Patent and Trademark Office Re.: U.S. Appl. No. 10/618,962.
Notice of Allowance Dated May 12, 2011 From the US Patent and Trademark Office Re.: U.S. Appl. No. 11/902,009.
Notice of Allowance Dated Aug. 16, 2010 From the US Patent and Trademark Office Re.: U.S. Appl. No. 11/902,009.
Notice of Allowance Dated Jul. 20, 2011 From the US Patent and Trademark Office Re.: U.S. Appl. No. 12/496,669.
Notice of Allowance Dated Dec. 21, 2012 From the US Patent and Trademark Office Re. U.S. Appl. No. 13/295,119.
Notice of Allowance Dated May 23, 2013 From the US Patent and Trademark Office Re. U.S. Appl. No. 12/007,441.
Notice of Allowance Dated Mar. 24, 2009 From the US Patent and Trademark Office Re.: U.S. Appl. No. 09/787,265.
Notice of Allowance Dated Nov. 24, 2010 From the US Patent and Trademark Office Re.: U.S. Appl. No. 12/272,828.
Notice of Allowance Dated Oct. 26, 2006 From the US Patent and Trademark Office Re.: U.S. Appl. No. 09/743,065.
Notice of Panel Decision From Pre-Appeal Brief Review Dated Aug. 17, 2012 From the US Patent and Trademark Office Re.: U.S. Appl. No. 12/079,000.
Official Action Dated Apr. 2, 2010 From the US Patent and Trademark Office Re.: U.S. Appl. No. 12/272,828.
Official Action Dated Dec. 2, 2010 From the US Patent and Trademark Office Re.: U.S. Appl. No. 10/668,109.
Official Action Dated Jun. 2, 2005 From the United States Patent and Trademark Office Re.: U.S. Appl. No. 09/853,017.
Official Action Dated Sep. 2, 2004 From the United States Patent and Trademark Office Re.: U.S. Appl. No. 09/806,789.
Official Action Dated Aug. 3, 2012 From the US Patent and Trademark Office Re. U.S. Appl. No. 13/229,784.
Official Action Dated Feb. 3, 2010 From the US Patent and Trademark Office Re.: U.S. Appl. No. 12/007,441.
Official Action Dated Aug. 4, 2008 From the United States Patent and Trademark Office Re.: U.S. Appl. No. 10/618,962.
Official Action Dated Jun. 4, 2007 From the United States Patent and Trademark Office Re.: U.S. Appl. No. 10/618,962.
Official Action Dated Jun. 5, 2013 From the US Patent and Trademark Office Re. U.S. Appl. No. 13/083,643.
Official Action Dated Apr. 6, 2006 From the United States Patent and Trademark Office Re.: U.S. Appl. No. 09/806,618.
Official Action Dated Aug. 6, 2010 From the US Patent and Trademark Office Re.: U.S. Appl. No. 12/079,000.
Official Action Dated Jan. 6, 2009 From the US Patent and Trademark Office Re.: U.S. Appl. No. 10/668,109.
Official Action Dated Sep. 6, 2012 From the US Patent and Trademark Office Re. U.S. Appl. No. 13/295,119.
Official Action Dated Jan. 7, 2005 From the United Stated Patent and Trademark Office Re: U.S. Appl. No. 09/853,017.
Official Action Dated Mar. 7, 2011 From the US Patent and Trademark Office Re.: U.S. Appl. No. 12/079,000.
Official Action Dated Oct. 7, 2004 From the United States Patent and Trademark Office Re.: U.S. Appl. No. 09/806,618.
Official Action Dated Nov. 8, 2012 From the US Patent and Trademark Office Re.: U.S. Appl. No. 10/668,109.
Official Action Dated Jan. 9, 2006 From the United Stated Patent and Trademark Office Re: U.S. Appl. No. 09/853,017.
Official Action Dated Apr. 10, 2013 From the US Patent and Trademark Office Re. U.S. Appl. No. 12/903,240.
Official Action Dated Feb. 10, 2011 From the US Patent and Trademark Office Re.: U.S. Appl. No. 12/007,441.
Official Action Dated Jan. 10, 2013 From the US Patent and Trademark Office Re.: U.S. Appl. No. 12/007,441.
Official Action Dated Mar. 10, 2010 From the US Patent and Trademark Office Re.: U.S. Appl. No. 11/902,009.
Official Action Dated Nov. 10, 2010 From the US Patent and Trademark Office Re.: U.S. Appl. No. 12/496,669.

(56) References Cited

OTHER PUBLICATIONS

Official Action Dated Feb. 11, 2008 From the United States Patent and Trademark Office Re.: U.S. Appl. No. 09/787,265.
Official Action Dated Jul. 11, 2013 From the US Patent and Trademark Office Re. U.S. Appl. No. 10/668,109.
Official Action Dated Apr. 12, 2012 From the US Patent and Trademark Office Re.: U.S. Appl. No. 12/079,000.
Official Action Dated Aug. 12, 2004 From the United States Patent and Trademark Office Re.: U.S. Appl. No. 09/831,935.
Official Action Dated Aug. 12, 2013 From the US Patent and Trademark Office Re. U.S. Appl. No. 12/079,000.
Official Action Dated Jun. 13, 2007 From the United States Patent and Trademark Office Re.: U.S. Appl. No. 11/339,275.
Official Action Dated Nov. 14, 2006 From the United States Patent and Trademark Office Re.: U.S. Appl. No. 09/806,789.
Official Action Dated Jan. 15, 2010 From the US Patent and Trademark Office Re.: U.S. Appl. No. 11/902,009.
Official Action Dated Nov. 15, 2011 From the US Patent and Trademark Office Re.: U.S. Appl. No. 12/007,441.
Official Action Dated Sep. 15, 2011 From the US Patent and Trademark Office Re.: U.S. Appl. No. 12/007,441.
Official Action Dated Dec. 17, 2003 From the United States Patent and Trademark Office Re.: U.S. Appl. No. 09/853,017.
Official Action Dated Feb. 17, 2011 From the US Patent and Trademark Office Re.: U.S. Appl. No. 12/496,669.
Official Action Dated Jan. 17, 2013 From the US Patent and Trademark Office Re.: U.S. Appl. No. 12/079,000.
Official Action Dated May 17, 2005 From the United States Patent and Trademark Office Re.: U.S. Appl. No. 09/831,935.
Official Action Dated Jan. 18, 2008 From the United States Patent and Trademark Office Re.: U.S. Appl. No. 10/618,962.
Official Action Dated Jun. 18, 2012 From the US Patent and Trademark Office Re.: U.S. Appl. No. 12/007,441.
Official Action Dated Mar. 18, 2009 From the US Patent and Trademark Office Re.: U.S. Appl. No. 10/618,962.
Official Action Dated Jun. 19, 2007 From the United States Patent and Trademark Office Re.: U.S. Appl. No. 09/806,789.
Official Action Dated Mar. 19, 2008 From the United States Patent and Trademark Office Re.: U.S. Appl. No. 10/668,109.
Official Action Dated Oct. 19, 2011 From the US Patent and Trademark Office Re.: U.S. Appl. No. 12/079,000.
Official Action Dated Aug. 20, 2009 From the US Patent and Trademark Office Re.: U.S. Appl. No. 12/272,828.
Official Action Dated Mar. 20, 2012 From the US Patent and Trademark Office Re. U.S. Appl. No. 13/229,784.
Official Action Dated Feb. 21, 2008 From the United States Patent and Trademark Office Re.: U.S. Appl. No. 11/339,275.
Official Action Dated May 21, 2007 From the United States Patent and Trademark Office Re.: U.S. Appl. No. 09/806,618.
Official Action Dated Jul. 22, 2009 From the US Patent and Trademark Office Re.: U.S. Appl. No. 12/007,441.
Official Action Dated Jul. 22, 2010 From the US Patent and Trademark Office Re.: U.S. Appl. No. 12/007,441.
Official Action Dated Aug. 23, 2012 From the US Patent and Trademark Office Re.: U.S. Appl. No. 12/079,000.
Official Action Dated Oct. 23, 2003 From the United States Patent and Trademark Office Re.: U.S. Appl. No. 09/787,265.
Official Action Dated Mar. 24, 2011 From the US Patent and Trademark Office Re.: U.S. Appl. No. 10/668,109.
Official Action Dated Sep. 24, 2009 From the US Patent and Trademark Office Re.: U.S. Appl. No. 10/668,109.
Official Action Dated Jan. 25, 2003 From the US Patent and Trademark Office Re.: U.S. Appl. No. 09/787,265.
Official Action Dated May 25, 2005 From the US Patent and Trademark Office Re.: U.S. Appl. No. 09/806,789.
Official Action Dated Sep. 25, 2006 From the US Patent and Trademark Office Re.: U.S. Appl. No. 09/787,265.
Official Action Dated Sep. 25, 2006 From the US Patent and Trademark Office Re.: U.S. Appl. No. 11/339,275.
Official Action Dated Jan. 26, 2006 From the US Patent and Trademark Office Re.: U.S. Appl. No. 09/831,935.
Official Action Dated Apr. 29, 2010 From the US Patent and Trademark Office Re.: U.S. Appl. No. 10/668,109.
Official Action Dated Jun. 29, 2007 From the US Patent and Trademark Office Re.: U.S. Appl. No. 09/787,265.
Official Action Dated May 29, 2012 From the US Patent and Trademark Office Re.: U.S. Appl. No. 10/668,109.
Official Action Dated Oct. 29, 2008 From the US Patent and Trademark Office Re.: U.S. Appl. No. 09/787,265.
Official Action Dated Aug. 30, 2006 From the US Patent and Trademark Office Re.: U.S. Appl. No. 09/853,017.
Proceedings Further With the European Patent Application Pursuant to Rule 70(2) EPC Dated Jun. 11, 2013 From the European Patent Office Re. Application No. 02707082.0.
Response Dated Feb. 2, 2010 to Official Action of Jan. 15, 2010 From the US Patent and Trademark Office Re.: U.S. Appl. No. 11/902,009.
Response Dated Jun. 6, 2011 to Official Action of Mar. 7, 2011 From the US Patent and Trademark Office Re.: U.S. Appl. No. 12/079,000.
Response Dated Nov. 8, 2010 to Official Action of Aug. 6, 2010 From the US Patent and Trademark Office Re.: U.S. Appl. No. 12/079,000.
Response Dated Dec. 9, 2010 to Official Action of Nov. 10, 2010 From the US Patent and Trademark Office Re.: U.S. Appl. No. 12/496,669.
Response Dated Jun. 9, 2011 to Official Action of Feb. 10, 2011 From the US Patent and Trademark Office Re.: U.S. Appl. No. 12/007,441.
Response Dated Oct. 10, 2011 to Official Action of Sep. 15, 2011 From the US Patent and Trademark Office Re.: U.S. Appl. No. 12/007,441.
Response Dated Jul. 12, 2010 to Official Action of Mar. 10, 2010 From the US Patent and Trademark Office Re.: U.S. Appl. No. 11/902,009.
Response Dated May 17, 2011 to Official Action of Feb. 17, 2011 From the US Patent and Trademark Office Re.: U.S. Appl. No. 12/496,669.
Response Dated Dec. 21, 2010 to Official Action Dated Aug. 6, 2010 From the US Patent and Trademark Office Re.: U.S. Appl. No. 12/079,000.
Response Dated Aug. 22, 2010 to Official Action of Apr. 29, 2010 From the US Patent and Trademark Office Re.: U.S. Appl. No. 10/668,109.
Response Dated Dec. 22, 2009 to Official Action of Aug. 20, 2009 From the US Patent and Trademark Office Re.: U.S. Appl. No. 12/272,828.
Response Dated Dec. 22, 2010 to Communication Pursuant to Article 94(3) EPC of Aug. 18, 2010 From the European Patent Office Re. Application No. 01908897.0.
Response Dated Nov. 22, 2010 to Official Action of Jul. 22, 2010 From the US Patent and Trademark Office Re.: U.S. Appl. No. 12/007,441.
Response Dated Jun. 23, 2011 to Response of Mar. 24, 2010 to Official Action of Sep. 24, 2009 From the US Patent and Trademark Office Re.: U.S. Appl. No. 10/668,109.
Response Dated Mar. 24, 2010 to Official Action of Sep. 24, 2009 From the US Patent and Trademark Office Re.: U.S. Appl. No. 10/668,109.
Response Dated Jul. 25, 2011 to Communication Pursuant to Article 94(3) EPC of Mar. 25, 2011 From the European Patent Office Re. Application No. 02718485.2.
Response Dated Dec. 27, 2010 to Official Action of Dec. 2, 2010 From the US Patent and Trademark Office Re.: U.S. Appl. No. 10/668,109.
Response Dated Jul. 27, 2010 to Official Action of Apr. 2, 2010 From the US Patent and Trademark Office Re.: U.S. Appl. No. 12/272,828.
Response Dated Mar. 31, 2010 to Official Action of Feb. 3, 2010 From the US Patent and Trademark Office Re.: U.S. Appl. No. 12/007,441.
Restriction Official Action Dated Dec. 5, 2012 From the US Patent and Trademark Office Re. U.S. Appl. No. 12/903,240.
Restriction Official Action Dated Jan. 25, 2012 From the US Patent and Trademark Office Re. U.S. Appl. No. 13/229,784.
Supplemental Notice of Allowability Dated Jul. 11, 2013 From the US Patent and Trademark Office Re. U.S. Appl. No. 13/316,710.

(56) References Cited

OTHER PUBLICATIONS

Supplemental Notice of Allowability Dated Dec. 16, 2008 From the US Patent and Trademark Office Re.: U.S. Appl. No. 11/339,275.
Supplemental Notice of Allowability Dated Aug. 18, 2011 From the US Patent and Trademark Office Re.: U.S. Appl. No. 12/752,181.
Supplementary European Search Report Dated Feb. 24, 2010 From the European Patent Office Re. Application No. 01908897.0.
Supplementary European Search Report Dated May 24, 2013 From the European Patent Office Re. Application No. 02707082.0.
Written Opinion Dated Aug. 16, 2000 From the International Preliminary Examining Authority of the Patent Cooperation Treaty re.: Application No. PCT/IL99/00525.
Ahuja et al. "An Analog Front End for a Two-Chip 2400-Bit/s Voice-Band Modem", Intel Corporation, IEEE Journal of Solid-State Circuits, 22(6): 996-1003, 1987. Abstract.
Encotone "The Technology", TeleIDTM System, Encotone Ltd., 8 P., Retrieved From the Internet, 1998.
Encotone Encotone, Ltd.—Corporate Background, 2 P., Retrieved From the Internet, 1998.
Notice of Allowance Dated May 7, 2014 From the US Patent and Trademark Office Re. U.S. Appl. No. 14/176,278.
Official Action Dated Jan. 2, 2014 From the US Patent and Trademark Office Re. U.S. Appl. No. 10/668,109.
Official Action Dated Dec. 27, 2013 From the US Patent and Trademark Office Re. U.S. Appl. No. 12/079,000.
Advisory Action Before the Filing of an Appeal Brief Dated Jun. 23, 2014 From the US Patent and Trademark Office Re. U.S. Appl. No. 13/083,643.
Applicant-Initiated Interview Summary Dated Jun. 12, 2014 From the US Patent and Trademark Office Re. U.S. Appl. No. 12/079,000.
Official Action Dated Jul. 31, 2014 From the US Patent and Trademark Office Re. U.S. Appl. No. 12/079,000.
Summons to Attend Oral Proceedings Pursuant to Rule 115(1) EPC Dated Jul. 23, 2014 From the European Patent Office Re. Application No. 02707082.0.
Summons to Attend Oral Proceedings Pursuant to Rule 115(1) EPC Dated Nov. 21, 2013 From the European Patent Office Re. Application No. 02718485.2.
Official Action Dated Dec. 17, 2013 From the US Patent and Trademark Office Re. U.S. Appl. No. 13/083,643.
Official Action Dated Feb. 4, 2014 From the US Patent and Trademark Office Re. U.S. Appl. No. 13/964,208.
Supplemental Notice of Allowability Dated Jul. 16, 2014 From the US Patent and Trademark Office Re. U.S. Appl. No. 14/176,278.
Communication Pursuant to Article 94(3) EPC Dated Sep. 26, 2013 From the European Patent Office Re. Application No. 02707082.0.

* cited by examiner

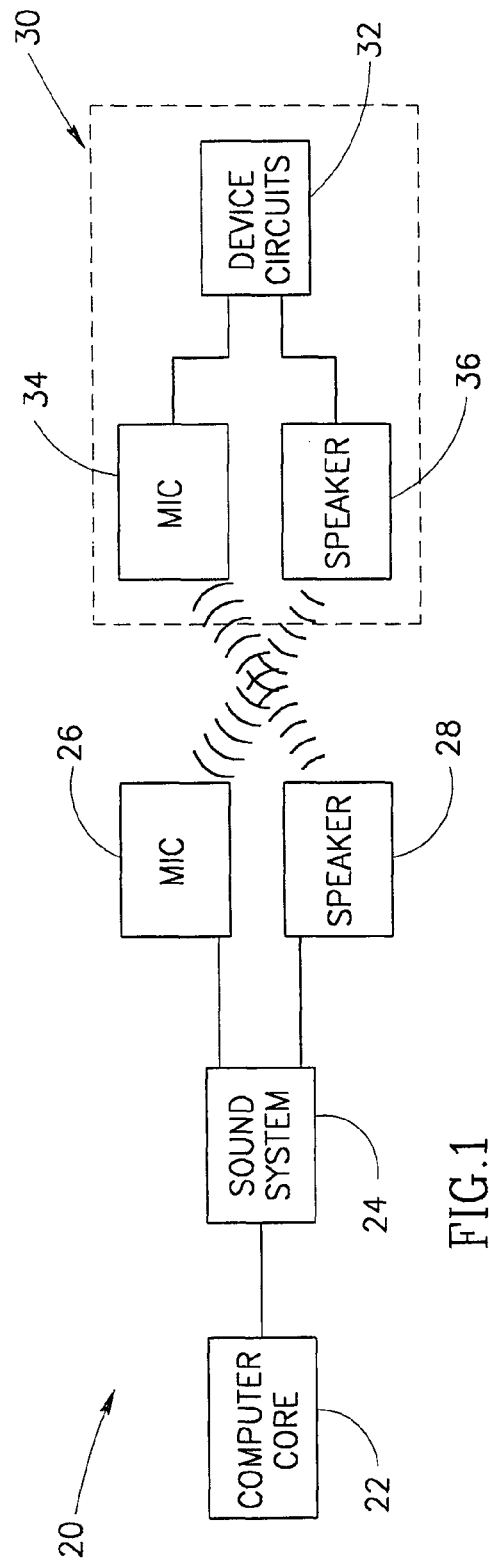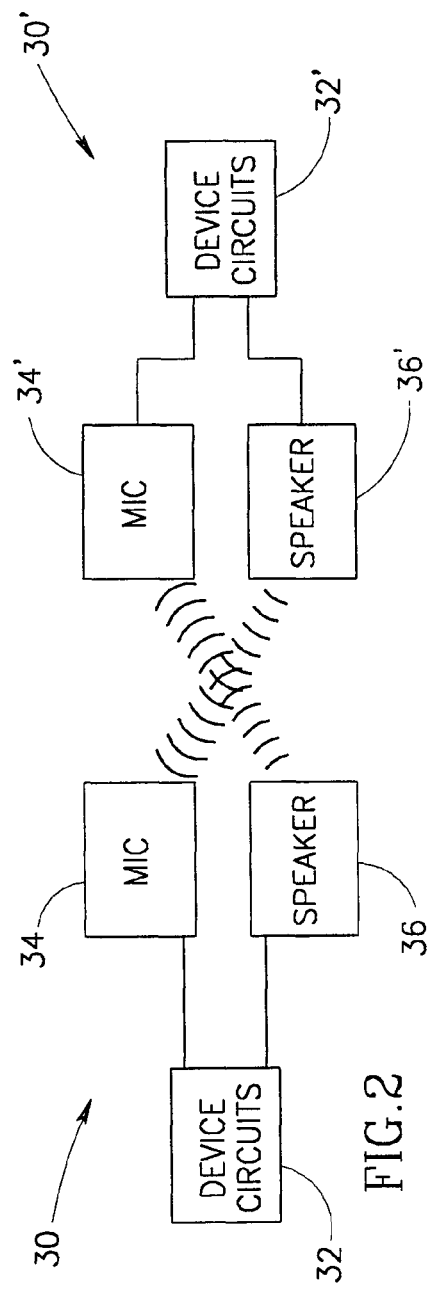
FIG.1
FIG.2

CARD FOR INTERACTION WITH A COMPUTER

RELATED APPLICATIONS

This application is a continuation of U.S. patent application Ser. No. 12/007,441 filed Jan. 10, 2008, which is a division of U.S. patent application Ser. No. 09/806,789 filed Jan. 22, 2002, now U.S. Pat. No. 7,334,735, which is a National Phase of PCT Patent Application No. PCT/IL99/00525 filed Oct. 4, 1999, which claims the benefit of priority of U.S. Provisional Patent Application Nos. 60/153,858 filed Sep. 14, 1999, 60/145,342 filed Jul. 23, 1999, 60/143,220 filed Jul. 9, 1999, 60/122,687 filed Mar. 3, 1999, and 60/115,231 filed Jan. 8, 1999, and which claims the benefit of Israel Patent Application Nos. 127569 filed Dec. 14, 1998, 127072 filed Nov. 16, 1998, and 126444 filed Oct. 2, 1998.

PCT Patent Application No. PCT/IL99/00525 is also a continuation-in-part of PCT Patent Application Nos. PCT/IL99/00521 filed Oct. 1, 1999, PCT/IL99/00506 filed Sep. 16, 1999, and PCT/IL99/00470 filed Aug. 27, 1999. The disclosures of all of these applications are incorporated herein by reference.

FIELD OF INVENTION

The present invention relates generally to smart-cards for interaction with a computer and especially to cards that use acoustic signals for such communications.

BACKGROUND OF THE INVENTION

Computer network components that communicate using RF radiation, wires or IR radiation are well known. Dedicated ultrasonic acoustic links are known for various types of electronic devices. Typically, high frequencies are used, to increase bandwidth and reduce noise.

However, such dedicated communication mechanisms require that the computer network components have installed thereon specialized communication hardware. Installing such hardware on an existing computer may be expensive and/or problematic. Further, some electronic and/or computer embedded devices, for example cellular telephones may be "sealed" products, to which it is impossible to add internal components.

PCT publications WO96/10880, WO94/17498, WO93/21720 and WO93/11619, the disclosures of which are incorporated herein by reference describe an electronic device which transmits coded information to a microphone of a telephone using a DTMF-like encoding scheme. A WWW page addressed "http://www.encotone.com/html/tech_def.html", available Feb. 1, 1999, but possibly published prior to that date, suggests using such a device to transmit audible DTMF-like tones to a personal computer using the computer's sound card.

Two way communications using audible DTMF-like tones, between a smart-card and a telephone communication system is described in U.S. Pat. No. 5,583,933, the disclosure of which is incorporated herein by reference.

SUMMARY OF THE INVENTION

One object of some preferred embodiments of the invention is to simplify interaction between a smart-card and a computer or other electronic devices by removing a common requirement of installing dedicated communication hardware on the computer. The removal of the need for installing new hardware is especially useful for electronic wallets and Internet commerce, where the cost of installing dedicated hardware may prevent wide acceptance of these commercial methods. Additionally, using a smart-card can provide methods of solving the security and accountability issues entailed in electronic commerce.

Some suitable electronic devices with which a smart-card can usefully communicate include: computers, televisions, watches, PDAs, organizers, electronic toys, electronic games, voice-responsive appliances, wireless communication devices, answering machines and desktop telephones. As used herein the term "electronic device" is used to encompass a broad range of electronics-including devices. In some of the embodiments described below, a particular type of electronic device is singled out, for example a computer, as some of the below-described embodiments are more useful for some types of electronic devices, than for other types of electronic devices. However, such examples are not meant to limit the scope of the invention. Although embodiments, in which no modification of the electronic devices is needed, are especially preferred, in particular acoustic based embodiments, some features of the invention may be usefully applied using standard types of smart-cards, such as RF cards.

An object of some preferred embodiments of the invention is allowing a smart-card to communicate with an electronic device using an input and/or output channel, preferably an acoustic channel, but possibly a visual channel, which was designed for communication with human users and not for communication with electronic devices. In other cases, the communication channel is not originally intended for communication with outside components at all, for example, a diskette drive or using leakage RF generated (or picked up) by the computer or peripherals thereof. In some embodiments, the smart-card communicates with computer peripherals, either directly or using a computer, for at least one direction of communication.

It should be appreciated that in some embodiments of the invention the sound communication is directed at the device for its use, control and/or processing and is not meant for mere passing through the device. For example, a telephone may interpret signals from a smart-card, rather than transmitting them on through the telephone network, as in the prior art. However, in other embodiments the sound communication is alternatively or additionally passed through the device to a remote second device.

An aspect of some preferred embodiments of the invention relates to a smart-card suitable for communicating with a computer using a sound card installed on the computer. In some computer configurations the installation is permanent, for example as part of the motherboard chip-set. In a preferred embodiment of the invention, a smart-card transmits information to the sound card's microphone and receives information form the computer using the sound card's loudspeaker. Preferably, the transmission uses non-audible acoustic frequencies, for example ultrasonic or infrasonic frequencies. Such a card preferably includes a speaker and driving circuitry suitable for generating low-frequency ultrasound. It should be noted that standard music cards are designed for music generation, however, they have a limited reception and transmission ability in the near-ultrasonic (e.g., between 17 kHz and 50 kHz) and infrasonic (e.g., 0.01 Hz to 20 Hz) frequency ranges. The definition of audible frequencies will usually depend on the user and this, may, in some embodiments, impact on the selection of frequencies for use. Possibly, a personalization software for selecting the frequencies will be provided. Also, in some applications, the higher end of the audible range may be used, for example 14 kHz-17 kHz, as the sensitivity to these frequencies is quite low, even in those individuals that can detect them. In general, the sensitivity to higher frequencies is reduced as a function of age. It is expected that many users of smart cards are mature adults or teenagers, with significant loss of hearing at very high frequencies. As used herein, audible frequencies refers to the range 20 Hz-17 kHz.

An aspect of some preferred embodiments of the invention relates to providing a memory on an acoustic smart-card for storing various information, including, biometrics information, personal identification information, passwords and/or e-commerce related information. In a preferred embodiment of the invention, this information is transmitted to a computer during an Internet connection and/or to assist in logging-on.

An aspect of some preferred embodiments of the invention relates to the provision of software on a computer in communication with a smart-card, which software can serve for one or more of modifying the presentation of information on the computer, downloading information from the smart-card, interacting with the smart-card and inserting information form the smart-card into fields of a displayed WWW page. In some preferred embodiments of the invention this software is downloaded with a displayed WWW page. Optionally, the software on the local computer with which the smart-card is in direct communication, pipes through the input from the card, possibly as sound files to a remote computer, which processes the input.

An aspect of some preferred embodiments of the invention relates to providing a smart-card with a text-to-speech capability. Preferably, this capability is used to provide feedback to a user on the card status. Alternatively or additionally, this capability is used to allow the smart-card to operate as an interface with an electronic device which cannot generate speech. Alternatively or additionally, this capability is used for displaying information to a user, such as reminders.

An aspect of some preferred embodiments of the invention relates to providing a smart-card having a biometric capability. This capability may include acquisition and/or processing of biometric data, such as speech, handwriting and gestures. In an exemplary embodiment, motion of the card relative to a computer can be detected. Alternatively or additionally, writing on the card can be recognized. Alternatively or additionally, the card includes a speech input. Preferably the card includes biometric information to match against the biometric acquired data, however, the matching may be performed on or off of the card.

An aspect of some preferred embodiments of the invention relates to a smart-card and card-holder combination in which some of the processing acquisition and/or power circuitry used by the card are mounted on the holder rather than on the card. Alternatively, the transmission range and/or other capabilities of the card are extended when the card is in the holder. Possibly, the holder includes a circuit for charging the smart-card or a wide angle antenna.

An aspect of some preferred embodiments of the invention relates to providing additional, non-smart-card functionally with a smart-card. In one example the additional functionality comprises a pager functionality. Alternatively or additionally, the functionality comprises a short-range telephone head set functionality. Alternatively or additionally, the functionality comprises a help-file presentation functionality. Alternatively or additionally, an acoustic smart-card functions as a security badge, for example for logging on.

An aspect of some preferred embodiments of the invention relates to a smart-card for authenticating presented information. In a preferred embodiment of the invention, the card reads a digital signature part of information presented by a different media and verifies the presented information. Alternatively or additionally, the card displays or vocalizes important elements of the displayed information or a deal in progress, for example, the amounts, the description of the goods and/or the vendor, e.g., for ease of verification or confirmation.

An aspect of some preferred embodiments of the invention relate to a color coded smart-card (or other types of identification card or electronic device in danger of theft). In a preferred embodiment of the invention, the color and/or pattern on the card changes by itself after a time and/or if a certain signal is not received on time. Alternatively or additionally, when such a device is listed as stolen, the next time it is used, the color is changed, possibly at a delay, so that the thief can be apprehended with a device which is marked as stolen.

An aspect of some preferred embodiments of the invention relates to inactivating a stolen electronic device. In a preferred embodiment of the invention, the electronic device interrogates an acoustic transponder using the device's built-in speaker and/or microphone. If the transponder does not respond (e.g., the device was stolen and separated from the transponder) or returns a bad response (such as having expired), the device does not work. If possible, the device transmits a message to an enforcement authority or to the owner, for example by computer network (e.g., for a laptop computer) or by wireless communication (e.g., for a cellular telephone). A particular type of stolen property is copyrighted software, which can be programmed to have the computer on which it is executing acoustically interrogate a nearby transponder, e.g., one attached to a case of the software and/or the computer. An illegal copy of the software will have no available transponder to respond to an interrogation, thereby identifying itself as stolen. Optionally, the program then communicates with the copyright owner. A similar scheme can be used to protect multimedia, such as MP3 music and video, which a certain device will not play unless a card is present. This card may also be used for billing purposes.

An aspect of some embodiments of the present invention relates to a method of deactivating a stolen or misused smart-card. In a preferred embodiment of the invention, when a card transmits an incorrect authentication code, if the card is reported stolen and/or due to failure of biometric or password based recognition, a computer with which the card is in communication preferably gives the card a command to erase portions of the card's memory and/or deactivate the card. In a preferred embodiment of the invention, a deactivate command is authenticated, encrypted and/or signed, to identify the originator. Alternatively or additionally, a copy of the command is stored on the card, for later analysis. It should be noted that by using acoustic communication, many available computers can communicate with the card. Any of these computers may command the card to deactivate, even if the card is not in human-initiated communication with it. These available computers may be connected by a network and share a database of cards to be deactivated. Alternatively or additionally, a card may be deactivated when it expires, for example after a time, after a certain number of transactions and/or after a certain amount of money passes through it, thus a stolen card will deactivate after a while unless the user "recharges" it.

An aspect of some preferred embodiments of the invention relates to authorization and authentication over an Internet or other type of communication network, using sound. Preferably, the normal communication pathway is not changed, except that the two ends of the pathway may require possibly hardware or software for manipulating sound signals. In one example, a smart-card transmits an encoded acoustic signal to a computer. That signal is transmitted over the Internet (before decoding) to a remote server computer, to serve as authorization for debiting an account. In another example, in which information is transmitted in the opposite direction, a coded signal may be provided from a toy program depository, to be downloaded using acoustic waves to a toy that is near the computer. Such a coded signal may also be used to download information to a smart-card. Preferably the sound files are signed and/or encrypted, to prevent misuse.

An aspect of some preferred embodiments of the invention relates to transmission of power to a smart-card. In a preferred embodiment of the invention, the power is transmitted acoustically. Alternatively or additionally, the power is transmitted using light, preferably light coded with information. Preferably, the received power is stored, to be used for transmission and/or processing. In a preferred embodiment of the invention, the power is stored for short periods of time, for example several seconds. Alternatively, at least some of the power is stored for longer periods of time, for example minutes or hours. In a preferred embodiment of the invention when the power is transmitted using an acoustic wave, preferably an ultrasonic wave is used, possibly the same wave as is used for communication. Generally however, the power wave is transmitted for a considerably longer duration than an information bearing wave. Additionally or alternatively, power is transmitted using optical energy which is received by photoelectric cells on the smart-card. In one example, a smart-card is placed near a display to receive energy from the display. Possibly, the energy is modulated, spatially or temporally, to transmit information to the smart-card, in addition to transmitting power. Alternatively or additionally, the card may receive (and store) power radiated by the screen control circuitry as electromagnetic signals.

An aspect of some preferred embodiments of the invention relates to smart-card construction. In a preferred embodiment of the invention, the entire card is formed of a piezoelectric material and the frequencies transmitted and/or received by the smart-card are a function of the acoustic characteristics of the card. Additionally or alternatively, only a portion of the card is electrified for transmission and/or reception, for example, only a portion underlying a magnetic strip or a pasted image, is electrified. Additionally or alternatively, only a portion of the card possess a required piezoelectric effect, for example as a result of selective polarization during manufacture. In embodiments where different transducers are used for transmission and reception, different areas may be electrified for each use.

There is thus provided in accordance with a preferred embodiment of the invention, a smart card comprising:

a memory for storing information;

at least one transmitting or receiving antenna; and a low frequency circuit, for handling information associated with said antenna and said memory, which information is modulated at a modulation frequency of between 5 kHz and 100 kHz.

Preferably, said at least one antenna comprises an individual transmission antenna. Alternatively or additionally, said at least one antenna comprises an individual reception antenna. Alternatively, said at least one antenna comprises a combined antenna for both reception and transmission.

In a preferred embodiment of the invention, said at least one antenna comprises an array antenna. Alternatively or additionally, said at least one antenna comprises an acoustic antenna. Alternatively or additionally, said at least one antenna comprises an RF antenna.

In a preferred embodiment of the invention, said card comprises a processor for processing said information. Preferably, said processor generates a response to an interrogation of said smart card. Alternatively or additionally, said memory comprises a long-term memory. Alternatively or additionally, said memory comprises a temporary memory for said processor.

In a preferred embodiment of the invention, said modulation frequency is less than 80 kHz. Alternatively, said modulation frequency is less than 60 kHz. Alternatively, said modulation frequency is less than 50 kHz. Alternatively, said modulation frequency is less than 40 kHz. Alternatively, said modulation frequency is less than 30 kHz. Alternatively, said modulation frequency is less than 25 kHz. Alternatively, said modulation frequency is less than 21 kHz.

In a preferred embodiment of the invention, said modulation frequency is over 10 kHz. Alternatively, said modulation frequency is over 14 kHz. Alternatively, said modulation frequency is over 16 kHz. Alternatively, said modulation frequency is over 17 kHz.

In a preferred embodiment of the invention, said at least one antenna comprises a piezoelectric antenna.

In a preferred embodiment of the invention, the card comprises a high-frequency circuit for modulating information at higher than 200 kHz. Alternatively, the card comprises a high-frequency circuit for modulating information at higher than 1 MHz. Preferably, said high frequency modulated information is transmitted using an RF circuit. Alternatively or additionally, said high frequency modulated information is received using an RF circuit.

In a preferred embodiment of the invention, said smart card implements a two-way communication protocol. Alternatively or additionally, said protocol comprises an error correction protocol.

There is also provided in accordance with a preferred embodiment of the invention, a method of interfacing a smart-card and an electronic device, comprising:

providing a smart card;

providing an electronic device including at least one standard component, which component is not designed for digital communication; and driving said standard component to transmit or receive a digitally encoded signal between said electronic device and said smart card. Preferably, said standard component comprises a speaker. Alternatively or additionally, said signal comprises a low frequency RF signal. Alternatively or additionally, said signal comprises a low frequency ultrasonic signal.

In a preferred embodiment of the invention, said electronic device comprises a computer. Alternatively or additionally, said computer forwards said signal to a computer peripheral coupled to said computer.

In a preferred embodiment of the invention, said smart card and said computer have a two-way digital link. Alternatively, said smart card and said computer have a one-way link.

There is also provided in accordance with a preferred embodiment of the invention, a smart-card interfacing system, comprising:

a personal computer, comprising a memory and a sound system;

an acoustic smart card; and an interaction software in said memory which drives said personal computer to communicate with said smart card at a frequency higher than 10 kHz. Preferably, said communication is one-way. Alternatively, said communication is two-way.

In a preferred embodiment of the invention, the system comprises a connection to the Internet. Preferably, said computer comprises a network software for downloading said interaction software from said Internet.

In a preferred embodiment of the invention, said interaction software retrieves information from said smart card and inserts said information in at least one field of a WWW form displayed on said computer. Alternatively or additionally, said interaction software retrieves information form said smart card and controls a browser on said computer to show a particular WWW page responsive to said information.

There is also provided in accordance with a preferred embodiment of the invention, a smart card comprising:
  a memory;
  a text-to speech converter, for converting text from said memory into speech sounds; and
  an external communication link for communicating information to or from said memory. Preferably, the smart card meets EMV form standards. Alternatively or additionally, said communication link comprises an acoustic communication link and wherein said speech sounds are outputted using said acoustic link. Alternatively or additionally, the smart card comprises circuitry for receiving indications over said link and converting said indications into text. Alternatively or additionally, the smart card comprises a speech recognition circuit, for entering information into said smart card.

There is also provided in accordance with a preferred embodiment of the invention, a smart card comprising:
  a memory;
  a speech input circuit, for entering information into said memory; and
  an external communication link for communicating information to or from said memory. Preferably, said communication link comprises an acoustic communication link and wherein said speech sounds are inputted using said acoustic link.

There is also provided in accordance with a preferred embodiment of the invention, a smart card comprising:
  a memory;
  an external communication link for communicating information to or from said memory; and
  a biometric data acquisition circuit, for acquiring biometric data, wherein said circuit shares an input transducer with said communication link. Preferably, said communication link comprises an acoustic communication link. Alternatively or additionally, said biometric data acquisition circuit comprises a voice input circuit. Alternatively or additionally, said biometric data acquisition circuit comprises a motion determination circuit. Preferably, said biometric data comprises motion of the smart card in the form of a gesture. Alternatively or additionally, said biometric data comprises motion of the smart card in the form of handwriting.

In a preferred embodiment of the invention, the smart card comprises a processor for evaluating said biometric data against a sample of biometric data. Preferably, said biometric data is stored in said memory. Alternatively or additionally, said acquired biometric data is stored in said memory.

There is also provided in accordance with a preferred embodiment of the invention, a method of biometric authentication, comprising:
  moving a smart card by a person;
  detecting said motion using at least a circuit on said card; and
  analyzing said motion to obtain a biometric signature of said person. Preferably, detecting said motion comprises:
    detecting said motion using an inertial motion detector in said card. Alternatively or additionally, detecting said motion comprises:
    detecting said motion using an acoustic distance measurement, which measurement uses an acoustic transponder of said card.

In a preferred embodiment of the invention, said motion comprises a writing motion.

There is also provided in accordance with a preferred embodiment of the invention, a smart card comprising:
  an array of pressure detectors for determining spatial positions of pressure changes on said array;
  a memory; and
  an external communication link for transmitting information from said card responsive to information in said memory and said detected pressure changes. Preferably, said array detector comprises a SAW detector. Alternatively, said array detector comprises an array of individually electrified piezoelectric elements.

There is also provided in accordance with a preferred embodiment of the invention, a method of powering a smart card, comprising:
  transmitting ultrasonic waves to a smart card;
  receiving said waves by the smart card;
  converting said waves by said smart card into energy; and
  utilizing said energy by said smart card, for powering processing of data. Preferably, said waves encode said data. Alternatively or additionally, transmitting comprises transmitting from a computer speaker.

There is also provided in accordance with a preferred embodiment of the invention, a method of powering a smart card, comprising:
  transmitting light waves to a smart card;
  receiving said waves by the smart card;
  converting said waves by said smart card into energy; and
  utilizing said energy by said smart card, for powering the processing of data,
  wherein said waves encode said data. Preferably, the method comprises transmitting a result of said processing from said card using an ultrasonic link on said smart card. Alternatively or additionally, the method comprises transmitting a result of said processing from said card using an IR link on said smart card.

In a preferred embodiment of the invention, said transmitting is timed to synchronize with said processing. Alternatively or additionally, said transmitting is not synchronized with said processing.

There is also provided in accordance with a preferred embodiment of the invention, a method of interaction between a card and a computer, comprising:
  inserting said card into a drive for removable media other than said card of said computer; and
  transmitting information between said card and said drive. Preferably, said drive comprises a diskette drive. Alternatively or additionally, said drive comprises an optical disk drive.

In a preferred embodiment of the invention, the method comprises transmitting power from said computer to said smart card using a said drive.

There is also provided in accordance with a preferred embodiment of the invention, a method of charging a smart card, comprising:
  receiving by said smart card of ambient RF radiation;
  converting said received radiation into stored energy; and storing said energy by said smart card for later powering the operation of said smart card. Preferably, said ambient radiation comprises normally emitted radiation from a cellular telephone.

There is also provided in accordance with a preferred embodiment of the invention, a smart card comprising:

an inertial power source;

a memory; and an external communication link powered by said inertial source to transmit or receive information for said memory. Preferably, the internal power source comprises a storage battery which is recharged by said inertial power source.

There is also provided in accordance with a preferred embodiment of the invention, a smart card comprising:

a mechanical force transducer power source;

a memory; and an external communication link powered by said power source to transmit or receive information for said memory. Preferably, the internal power source comprises a storage battery which is recharged by said power source. Alternatively or additionally, said mechanical force transducer converts flexing of said card into electrical energy. Alternatively or additionally, said mechanical force transducer converts friction against said card into electrical energy.

There is also provided in accordance with a preferred embodiment of the invention, an optical smart card having a form of a rectangular credit card and comprising:

an optical data input circuit;

a wireless output link; and a memory for storing information from said input and outputting via said output link. Preferably, said optical input is a scalar input. Alternatively, said optical input is a one-dimensional input. Alternatively, said optical input is a two-dimensional input.

In a preferred embodiment of the invention, the card comprises an optical power input circuit, which converts ambient light into stored energy. Preferably, said optical power input and said optical data input share a common optical sensor.

In a preferred embodiment of the invention, said output link comprises an acoustic link. Alternatively or additionally, said output link comprises an IR link. Alternatively or additionally, said output link comprises an RF link.

There is also provided in accordance with a preferred embodiment of the invention, a two part smart card, comprising:

a first separable part including at least a memory portion of the smart card; and a second separable part comprising at least a holding element for holding said first part and an electronic circuit associated with an operation of said first part. Preferably, said electronic circuit comprises a power source. Preferably, said power source comprises a receiver for transmitted power. Alternatively or additionally, said power source comprises a battery.

In a preferred embodiment of the invention, said electronic circuit comprises an amplifier. Alternatively or additionally, said electronic circuit comprises an antenna.

In a preferred embodiment of the invention, said first part is an independently operable smart card. Alternatively, said first part requires said electrical circuit to operate.

There is also provided in accordance with a preferred embodiment of the invention, a smart card comprising:

a medium range communication link having a range of over 0.5 meters and suitable for communication with a computer;

a speaker; and circuitry for presenting information from said link over said speaker as speech. Preferably, the smart card comprises pager circuitry. Alternatively or additionally, the smart card comprises telephone handset circuitry. Alternatively or additionally, the smart card comprises acoustic help-file viewing circuitry.

In a preferred embodiment of the invention, said link comprises an acoustic link. Preferably, said speaker forms a part of said acoustic link. Alternatively or additionally, said acoustic link is operative to use office equipment as a base station from receiving said information. Preferably, said office equipment comprises computers with sound systems designed for music. Alternatively or additionally, said office equipment comprises telephone and wherein said card communicates using a speaker of said telephones.

There is also provided in accordance with a preferred embodiment of the invention, a device for extracting digitally signed information, comprising:

an input for receiving digitally signed information presented visually or acoustically by a computer separate from said device;

a processor that is part of said device for verifying said information using said signature; and a display on the device for presenting an indication responsive to said verification. Preferably, said input comprises at least one photocell adapted for reading off the computer's screen. Alternatively or additionally, said input comprises an electromagnetic coupler for reading signals passing on a display cable of the computer. Alternatively or additionally, said input comprises a pass-through plug for reading signals passing on a display cable of the computer. Alternatively or additionally, said input comprises at least one microphone adapted for receiving an acoustic signal from a computer. Alternatively or additionally, said device display comprises an acoustic display. Alternatively or additionally, said device display comprises a visual display. Alternatively or additionally, said displayed indication comprises a verification of the authenticity of the information. Alternatively or additionally, said displayed indication comprises at least portion of said information.

In a preferred embodiment of the invention, said device has a rectangular form of a credit card.

There is also provided in accordance with a preferred embodiment of the invention, a smart card comprising:

a communication link with a computer;

an authentication circuit for authenticating a transaction; and a display that displays pertinent information regarding the transaction, retrieved via said link from said computer, prior to authentication of said transaction by the smart card. Preferably, said display comprises a visual display. Alternatively or additionally, said display comprises an acoustic display. Alternatively or additionally, said pertinent information comprises an identification of a vendor with whom the transaction is being made. Alternatively or additionally, said pertinent information comprises an identification of goods being the subject of the transaction. Alternatively or additionally, the smart card comprises a memory for storing a record of acceptance of said transaction by a user of said smart card.

There is also provided in accordance with a preferred embodiment of the invention, a pattern changing smart card, comprising:

a memory;

a communication link for transmitting or receiving information from said memory; and a controllable pattern display having at least two states, a first state indicating that the smart card is valid and a second state indicating the smart card is invalid, wherein at least said second state does not draw current. Preferably, said pattern display changes to said second state over time unless otherwise activated. Alternatively or additionally, the card comprises circuitry for switching states of said pattern display to said second state. Alternatively or additionally, said circuitry comprises a delay circuit for delaying said changing for a period of time. Alternatively or additionally, the smart card comprises circuitry for receiving a command over said link to switch states. Preferably, said command is verified using a digital signing or encryption.

In a preferred embodiment of the invention, said invalid-indicating pattern in said second state is perceptible by a human viewer.

BRIEF DESCRIPTION OF THE DRAWINGS

The invention will be more clearly understood with reference to the following detailed descriptions of non-limiting preferred embodiments of the invention in which:

FIG. 1 is a schematic illustration of a smart-card and a computer which are operative to communicate using sound waves, in accordance with a preferred embodiment of the invention;

FIG. 2 is a schematic illustration of a smart-card communicating with an electronic device, in accordance with a preferred embodiment of the invention;

DETAILED DESCRIPTION OF PREFERRED EMBODIMENTS

Acoustic-Based Smart-Card

Figure 3A:
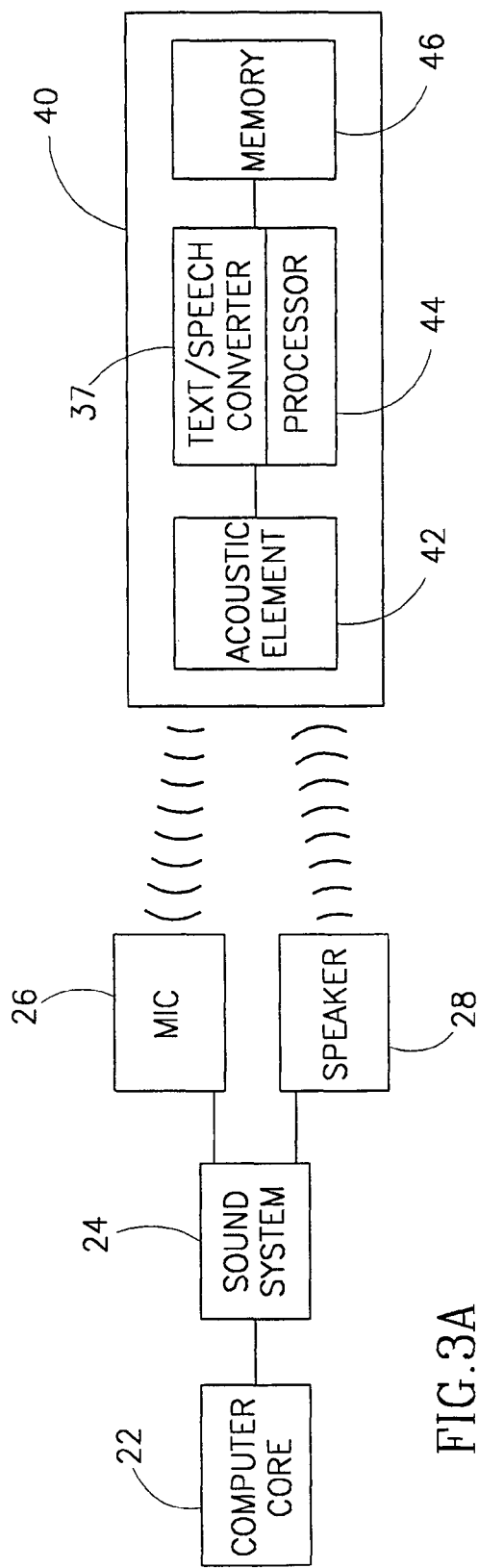
FIG. 3A is a schematic illustration of a smart-card communicating with a computer, in accordance with a preferred embodiment of the invention.

FIG. 1 is a schematic illustration of a computer 20 and a smart-card 30, which are operative to communicate using sound waves, in accordance with a preferred embodiment of the invention. Most computers currently on sale include a sound system 24, usually a sound card, connected to at least one microphone 26 and at least one speaker 28. A smart-card in accordance with a preferred embodiment of the invention includes acoustic transduction elements, such as a microphone 34 and a speaker 36, which serve as acoustic antennae. In a preferred embodiment of the invention, computer 20 and electronic device 30 communicate using these standard computer components of computer 20, which are usually not designed for computer communication but for human communication. In some cases, the smart-card (or the computer) may include a jack (or other connector) to which one or more speakers and one or more microphones may be connected. Preferably, such connected acoustic elements are positioned on a difficult to obstruct portion of the computer 20 and/or smart card 30, preferably at positions where they have a wide field of view.

Many computers are sold with a Sound-Blaster compatible sound subsystem, stereo speakers and a microphone. Some computers are provided with other types of sound systems, which types also support the application of preferred embodiments of the invention, possibly with a variation in frequencies to account for different circuit or sampling characteristics. Typically, this sound system is designed for generating music and other audible sounds. In addition, many computers include an internal speaker and a modem speaker. Some computers use USB speakers which are connected directly to the USB (Universal Serial Bus).

In one preferred embodiment of the invention, a standard sound card, such as the popular "Sound-Blaster" is used to generate sonic and/or ultrasonic signals to (and to alternatively or additionally receive them from) a smart-card. The acoustic signal may be audible (in some applications) or inaudible (more preferable), for example having mainly ultrasonic or infrasonic frequencies. Preferably, frequencies of about 22 kHz and 24 kHz and 32 kHz are used, since a standard sound card provides these sampling rates (and/or their multiples, e.g., 44 kHz and 48 kHz). Alternatively, lower frequencies, such as between 17 kHz and 21 kHz may be used. As used herein the term "main frequency" is used to describe the frequency band in which most of the energy of the information carrying signal is concentrated. In some cases, the information carrying portion of the signal is not at the main frequency generated by the card, for example when an ultrasonic signal is overlaid on a different audible sound.

In some preferred embodiments of the invention, a sound card is adapted to work in the near ultrasonic range, for example by increasing its sampling frequency. Generally, the microphone and loudspeaker used for a computer system can support low frequency ultrasound with sufficient fidelity without adaptation. However, in some embodiments of the invention, a special ultrasound-sensitive microphone or ultrasound-effective speaker may be used. In other cases, the sensitivity of a particular microphone and/or loudspeaker maybe determined by the user prior to or during communication with a smart-card. In one example, if a smart-card having known characteristics transmits a uniform or calibrated signal at several frequencies, the frequency sensitivity (and/or directional sensitively) of a microphone may be determined. In a similar manner, a computer may generate these sounds and the signals detected by the smart-card are analyzed to determine output characteristics of the particular loudspeaker used. In addition, a self-calibration procedure may be performed by listening to the computer's output using the computer's microphone. In some cases, both the smart-card and the computer sound systems can be calibrated by combining self testing and cross-testing.

Low Frequency RF Detection

In some cases, the microphone and/or the sound card are sensitive enough to receive, from the smart-card, an RF signal associated with generating the acoustic signals, even if an acoustic signal is not sent (e.g., no loudspeaker is present). In some cases, only an RF signal is generated. Alternatively or additionally, the object may detect RF signals generated by the speaker or sound card while generating the ultrasound. These RF signals are generally less affected by lack of line of sight than ultrasonic signals. In an exemplary embodiment, a device for communication with a telephone handset (or other devices where the speaker and microphone are displaced), can be made small, by allowing the detection of sounds from the telephone to be emulated by the detection of RF fields from the telephone speaker. Thus, a smart-card can be made small and placed against the telephone microphone and still receive signals from the telephone loudspeaker. Alternatively or additionally, the device may transmit RF fields to generate electrical signals at the telephone microphone. These transmitted and received signals may be ultrasonic or they may be sonic, for example DTMF or DTMF-like signals as known in the art.

Communication with a Non-Computer Device

Some embodiments of the invention do not require that the smart-card communicate with a computer. FIG. 2 is a schematic illustration of a smart-card 30 communicating directly or indirectly with an electronic device 30'. In one example, a smart-card communicates directly with a computer peripheral, such as a printer. In another example, the communication is via a computer, for example to utilize a modem, a storage device or a microphone-less printer, any of which may be interface with a computer as known in the art. Possibly, such communication is used to exchange data files and/or to share capabilities, such as modem connections, or to print or backup information using a standard desktop computer. In another example, a smart-card communicates with an organizer, either to update it or to retrieve information from it.

In some cases a port adapter may be required to be plugged into a port of the computer or other electronic device, for example a sonic-to-parallel adapter, which converts between acoustic signals and parallel port signals. As low ultrasonic frequencies are used in this type of smart-card, the port adapter can be made relatively simple.

In a preferred embodiment of the invention, a standard communication protocol/language is defined, so that many types of devices can communicate and/or share resources using the standard language.

In some preferred embodiments of the invention, smart-card 30 communicates with a set-top box, such as used for some types of cable TV. Preferably, a microphone is connected to the set-top box. Alternatively or additionally, the transmission to the set-top box uses an IR signal, which is detectable by the set-top box. In one example, the set-top box includes software that analyzes responses of the smart-card. Alternatively or additionally, the set-top box adds sounds (or ultrasonic waves) to a video and/or audio stream decompressed by the set-top box. Alternatively or additionally, the set-top box adds temporal and/or spatial optical modulations to a video stream, for an optically-sensitive smart-card, for example as described below.

Smart-Card Construction

FIG. 3A is a schematic illustration of a smart-card 40 that communicates with a computer 20. In a preferred embodiment of the invention, smart-card 40 comprises an acoustic receiving and/or transmitting element 42, a processor 44 that controls the acoustic element and a memory 46 for storing information. Such a smart-card may use a single piezoelectric transducer (possibly a film layer) for both acoustic transmission and reception, however, separate elements may also be used for element 42. Alternatively to a piezoelectric element, other acoustic signal detectors may be used, for example piezoresistive sensors, MEMS-based sensors, fiber-optic based acoustic detectors and small microphones. Processor 44 may include, in some embodiments of the invention, driving circuitry, clock circuitry, amplification buffering circuitry and/or other types of necessary circuitry, as well as signal and data processing circuitry. However, in some embodiments a single integrated circuit (shelf or ASIC) can perform some or all of these circuitry functions, so that the single generic term "processor" is used in the general description. Although the use of single integrated circuits is preferred, other types of circuitry, such as sets of integrated circuits or surface mounted elements may be used alternatively or additionally. While preferred embodiments of smart cards use a processor, more limited smart cards may have only simple logic circuitry, such as for retrieving information from the memory or updating counters.

Signals from the acoustic element are preferably digitized by an A/D on processor 44 or a separate A/D component. Output signals from processor 44 may be amplified with a nonlinear amplification circuit, however a linear amplifier may also be used in some embodiments. In some embodiments described below, processor 44 may include a text-to-speech or speech-to-text component 37.

Shielding

In some embodiments, the acoustic elements are shielded from stray electro-magnetic fields. In other embodiments, the elements are designed to act also as antenna for electromagnetic fields and as such, they may not be shielded.

Low Frequency RF Detection

A different method of receiving by the card is using an electromagnetic receiving antenna. The inventors have determined that a PC speaker and other sound generating equipment, when transmitting sound, also transmit electro-magnetic signals that can be received on the card using an antenna. Possibly, a same antenna can be used both for acoustic and RF reception, for example a piezoelectric crystal or a fiber-optic sensor.

In some applications, an advantage of detecting RF is that echoes and other noise sources are reduced in amplitude. Thus, a card can communicate with a standard telephone headset (or other devices where the speaker and microphone are displaced), the card communicating acoustically with one of the speaker and microphone and using RF for communication with the other one of the speaker and microphone.

Hybrid Card

It should be noted that although acoustic communication is preferred for at least one communication direction (computer to smart-card or smart-card computer) one or both of the communication directions may utilize other technologies, temporarily or on a permanent basis. For example, the card may use the IRDA-IR communications standard or the Bluetooth-RF communications standard. Alternatively or additionally, the card may connect directly or indirectly (via a suitable cable) to computer port. Such a suitable cable may include a contact-less transducer (e.g., ultrasound or RF) at one end thereof, to facilitate communication with the smart-card, without requiring a physical connection.

Power Transmission

Figure 3B:
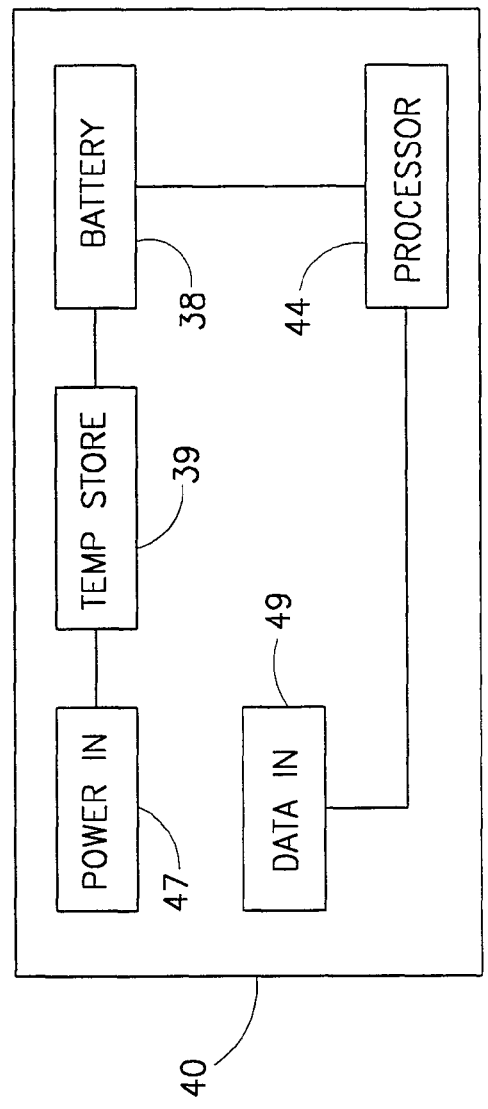
FIG. 3B is a schematic illustration of a smart-card, showing power distribution, in accordance with a preferred embodiment of the invention.

FIG. 3B is a schematic illustration of smart-card 40, showing power distribution, in accordance with a preferred embodiment of the invention. A smart-card in accordance with a preferred embodiment of the invention may be passively powered, in that the energy for powering the smart-card is transmitted with the data signal to be processed and/or responded to by the smart card. Alternatively, the smart-card may require some type of internal power source. In this respect it should be noted that some smart-cards can remain off, or at least in a power saving mode, most of the time. Logic for entering and exiting power saving modes and listening modes for communication devices are well known in the art of cellular telephones and may be implemented in smart-cards of the present invention. An example of such a logic is a periodic wake-up call or listening-in or a low quality analysis of ambient sounds to determine if a higher quality (and power consuming) analysis is required. In addition, the removal of a smart-card from a storage container, for use, may be detected, for example by the impingement of light on the card, increase in ambient sound levels or by pressure of the card user on the card, and this detection may be used to wake-up the card.

Also, some embodiments of the invention use low power signals for communication and/or processing. In some embodiments of the invention, most of the processing is on an associated computer or card holder and not on the card, further reducing the power needs of the card. Also, it should be noted that the card is typically near a power source, such as a computer, when the card is in use, so ready power is typically available.

In some preferred embodiments of the invention, the smart-card includes a battery 38, for example a lithium ion battery, for providing power to transmit, receive and/or process acoustic signals. Preferably, the battery is rechargeable. Alternatively, when the battery is depleted, the smart-card may be discarded, with the stored information being transferred to a second smart-card. Intentionally depleting the battery by remote command is one method of forcing the user to communicate with the card provider and/or deactivate a stolen card. In a preferred embodiment of the invention, before all the power is dissipated a warning is sounded and/or otherwise displayed to the user, so that he has advance notice to recharge or replace the card. Possibly, a discharged card can be used if inserted into a suitable contact reader, which supplies power to the card.

In some embodiments of the invention, power is provided from outside the card, for example by contact, or, more preferably, by wireless means. In a preferred embodiment of the invention, power provided by a power input 47 is accumulated or otherwise buffered in a temporary store 39, before being used to recharge battery 38 (if any) and/or power processor 44 and/or other components of smart-card 40. Wireless data input is designated by a separate reference 49, however, in some embodiments, a same element is used both for power and for data transmission. In some embodiments, more than one data input 49 may be provided. In some embodiments of the invention, several different modalities of data input are provided on a single smart-card.

In one exemplary embodiment of the invention, smart-card 40 is light-powered, for example solar powered or powered using room lighting. Additionally or alternatively, the smart-card includes a battery which is charged by optical wavelength energy, for example using a photoelectric cell on the smart-card. Preferably, this type of powering is used in conjunction with acoustic transmission from the card.

In a preferred embodiment of the invention, a card of this type is recharged or powered by placing a photo-cell thereof against a computer screen or a TV screen that is lit up. Alternatively or additionally to power transmission, the illumination of the screen is modified, spatially and/or temporally, to transmit information to the card. The modification of the illumination may be, for example by a computer or by a set-top box which control the screen. Transmission of information back to the computer and/or set-top box may be achieved using other methods described in this application, for example acoustic communication. The photocell may be a scalar cell, a vector of cells or a two dimensional array. As indicated above, a single cell may be used both for power reception and for data transmission and/or reception. Alternatively, separate cells or separate circuits connected to the cells are used for power and data. In an exemplary application, a DC portion of the signal from the photocell is utilized for power transfer and a variable portion for data transmission. In a preferred embodiment of the invention, the photocell or, in some cases a cell-array, is used to read visual information such as text or a bar code. Such information may be read using ambient light or using a LED on the card. The read information may be stored and/or transmitted on to a remote computer or other device.

Additionally or alternatively, power to activate the smart-card and/or to recharge its power cell may be provided from ambient RF or non-optical EM fields, such as those generated by florescent bulbs, computers, computer peripherals, computer speakers and cellular and wireless telephones. These sources of ambient RF fields may be controlled to provide power when needed by the smart-card, for example when in communication with the computer. Possibly, these sources are activated manually, however, in some embodiments, the device automatically receives an indication of the energy need of the smart-card and transmits energy. In a preferred embodiment of the invention, a casing for such a source includes a holder for a smart-card, so that the card is near the energy source. An exemplary embodiment is a cellular-telephone holder which includes a slot for a smart-card, so the card can receive power from the telephone.

Alternatively or additionally, power to the smart-card may be provided as an ultrasonic wave, possibly, but not necessarily, the same wave used to transmit information to the card. Optionally, reception of data and of power use a single acoustic receiving element, such as element 42 shown in FIG. 3A. Alternatively or additionally, in some embodiments, at least part of the same circuit is also used to transmit signals from the card. Although the power levels are generally low, the duration of transmission of power can be made relatively longer (minutes, hours) than the duration of the power usage (micro seconds, milliseconds).

Additionally or alternatively, the card may be recharged by plugging it into a PC-card slot, a USB plug or a different, suitably-sized, communication port. Optionally, once the card is plugged-in it transmits information using the communications port. The card preferably includes a plurality of electrical contacts at one of its ends and/or a connector-sized end. In one embodiment, the card includes an extending male or female socket which can be directly plugged into a port or possibly individual lines of a port, on an operating electronic device. The smart-card may generate a signal if the socket is attached to a line which provides sufficient energy for charging (and/or if it does not provide sufficient energy). Alternatively or additionally, the card may be plugged directly into a power outlet or coupled to a large external battery, for charging purposes. In a preferred embodiment of the invention, the card includes circuitry to automatically adapt to the type, polarity and/or amplitude of power source to which the card is coupled.

Additionally or alternatively, the card may be inserted into a CD-ROM drive or a diskette drive and obtain power from the motion of a head and/or a spinner motor. Possibly, the energy is transferred to the card by friction heating of the card (or a particular section 47 thereof) or by causing a vibration or other electrical-generating distortion of a piezoelectric portion of the card. Alternatively, the field generated by the motor of the drive is received by the card. Additionally or alternatively, the power is obtained from the read/write energies (laser, magnetic) used by the drive.

Additionally or alternatively, the card may be powered or recharged by inertial power, for example from movements of a person carrying the card, i.e., with power input 47 being fed by an internal component of the smart-card rather than by wireless feed. Various types of inertial power sources are known in the art, especially for watches. Additionally or alternatively, the card may include a piezoelectric power converter, possibly utilizing a same piezoelectric element as used for communication (acoustic or contact), to convert flexing of the card or varying pressure on the card (typically inadvertent pressure) into electrical energy. Possibly, the card can be energized from ambient vibrations, such as those caused by a computer, when the card is placed on the computer. Alternatively or additionally, the card is charged using microwave radiation, such as inside a microwave oven or by leakage from a microwave oven.

Alternatively or additionally, the card can be powered and/or recharged by a reading device, such as a contact or contactless reader or an ATM machine.

In some of the power transmission embodiments described herein, the power transmission is rapid, for example during a short reading session. Power received by the card during that short period may be stored in temporary store 39, such as a capacitor, prior to being used to recharge battery 38. Conversely, slowly arriving power, such as provided by low-amplitude power transmission methods, may need to be accumulated in temporary store 39, so that it can be used to charge battery 38 or power the card.

Battery Location

Preferably, the batteries are located in a portion of the smart-card underlying the embossed portion, which portion is allowed to be thicker than other parts of the card under the EMV standard. Thus, standard and/or lower cost batteries may be suitable.

Alternatively or additionally, the battery may be external to the smart-card, possibly fitting in a depression of the smart-card. Possibly, the battery has an adhesive coating used to attach the battery to the card. External batteries preferably have electrodes with matching leads on the smart-card. When the battery is depleted it may be removed and replaced.

Layout of Smart-Card Elements

Figure 3C:
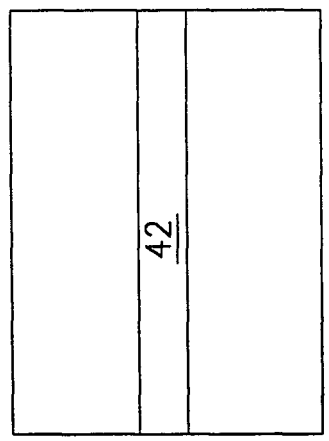
FIGS. 3C-3E are schematic illustrations of smart-card construction in accordance with preferred embodiments of the invention.
Figure 3E:
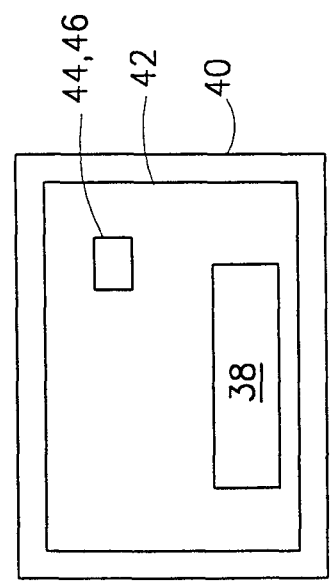
Figure 3D:
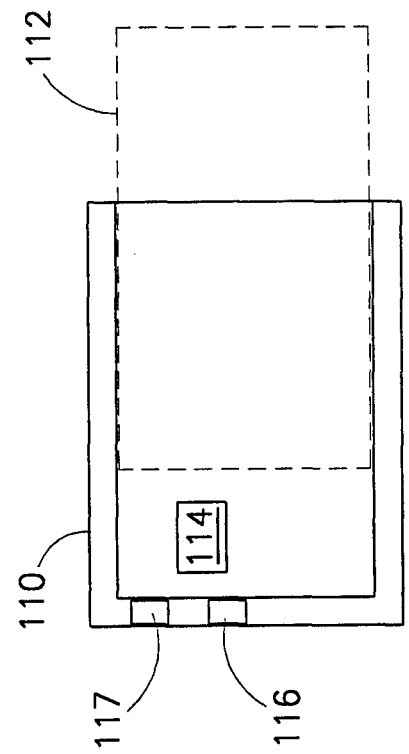

FIGS. 3C-3E are schematic illustrations of variations of smart-card structures, in accordance with preferred embodiments of the invention. In FIG. 3C, substantially all of one face of the card forms an acoustic transducer. The processor and the memory (44 and 46) are preferably embedded in the card. Battery 38 may be a thin battery which is embedded in the card or glued on it (shown for example in FIG. 3C). In one example, the card itself is manufactured of a piezoelectric material and area 42 indicates the region which is electrified using electrodes. In one embodiment, only two electrodes are used. In other embodiments, at least one of the electrodes comprises a plurality of electrodes, so that various acoustic modes may be excited and/or sensed in the card. In a preferred embodiment of the invention, the construction of the acoustic antenna is that of two electrodes with a piezoelectric material sandwiched between them. Possibly the piezoelectric material is the base material of the card itself.

In a preferred embodiment of the invention, the card is formed of a polarized plastic with piezoelectric properties, using manufacturing techniques known in the art. Possibly, only the portion of the card adjacent the electrodes is polarized. In some embodiments of the invention a same region 42 is used both for transmission and for reception, in others, separate regions are provided, which regions may overlap. It is noted that in some embodiments described herein, the acoustic frequencies used have wavelengths sizes on the order of the size of the smart-card or significant sections thereof. As can be appreciated, in some cases it is the card size and mechanical characteristics which determine the ultrasonic frequency to be used. Preferably, the size and thickness of the card are similar to that of a credit card. Possibly, card 40 is somewhat thicker than a credit card.

Smart-Card with Array Detector

In a preferred embodiment of the invention, region 42 comprises an array of electrodes and this array may be used to detect pressure on the card, for example pressure caused by moving a stylus over the card. Depending on the processing power of the card, this detection may be used as a handwriting input. In an example in which only a lower resolution is needed, pressure on certain areas of the card, can be detected, for example to emulate a keyboard on the card surface.

In an exemplary embodiment of the invention, at least part of the card is covered with a SAW device, which generates output signals indicative of an (X,Y) position of a pen tip on the SAW and/or the pressure against it. In an exemplary embodiment, a user signs a sales receipt over the SAW portion, so that both an electronic and paper record of the signature are made. the electronic copy may be sent immediately (or after a time) to a remote computer for processing.

Other Methods of Handwriting Recognition

Alternatively or additionally, handwriting input may be provided by incorporating the card functionality into a device such as a pen, whose position can be determined, for example by TOF (time of flight) measurements relative to the computer speaker. The determination of distance, or possibly position may be sufficient for biometric identification of the pen user, for identification of correctness of the signature and/or possibly for rudimentary or complete handwriting recognition.

Additional Uses of Piezoelectric Detectors

Alternatively or additionally to use as acoustic antennas, the piezoelectric regions may be used for power supply, as indicated above. Alternatively or additionally, the piezoelectric regions may be used to generate audible sounds, for example to play recordings or synthesized speech or indicator (e.g., beeps) sounds. Alternatively or additionally, the piezoelectric regions may be used as a sonic microphone, for speech input. Analysis of speech input may be performed on the card, on a nearby computer or on a remote computer to which recorded speech sounds are transmitted. It is noted that the card can include user-specific speech-recognition libraries, to assist in the speech recognition. Alternatively or additionally, the piezoelectric regions may be used to detect data input of a simpler kind, for example tapping, flexing, and/or bending of the card.

Dual Use Smart-Card

In FIG. 3D a magnetic strip is formed of a piezoelectric material, so it can serve as resonator 42. Alternatively or additionally, resonator 42 underlies the strip, possibly being embedded in the card. Thus, a card is provided with both magnetic and smart-card type capabilities.

Alternative Smart-Card Layout

In FIG. 3E a holograph glued onto the card (for example as in a VISA card), shown as a rectangle with the reference 42, serves as the ultrasonic transducer and/or to cover or contain the electronics of processor 44 and/or memory 46. In the photoelectric embodiments, above, an area 43 of the card may be embedded with photo-electric cells. Possibly, a same area is used both for photoelectric activity and for piezoelectric activity. In a preferred embodiment of the invention, card 40 includes an infra-red generating area 41, for example a LED or a surface patch (scalar, vector or two-dimensional array). Optionally, card 40 includes a thin-screen type display 45, for example an LCD display, for displaying information stored, transmitted and/or received and/or feedback.

Two Part Smart-Card

Figure 3F:
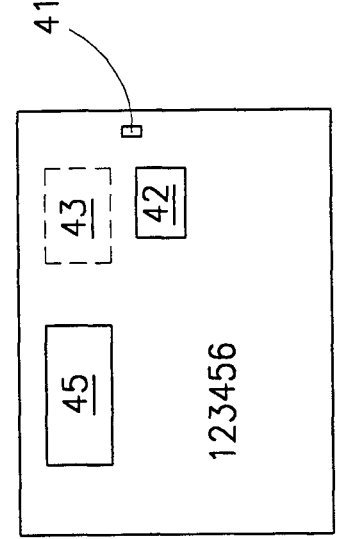
FIG. 3F is a schematic illustration of a smart-card holder in accordance with a preferred embodiment of the invention.

FIG. 3F is a schematic illustration of a smart-card holder 110 for holding a smart-card or smart badge 112, in accordance with a preferred embodiment of the invention. Holder 110 may be used, for example in those situations where the smart-card is used for identification purposes or for logging in, and a clear field of view to the card is desirable. Although a slotted holder is shown, other types of holders may be used, including clip-type holders and holders where the holder and smart card interlock mechanically.

The power supply of card 112 is preferably located on the card, for example as described above. However, in some preferred embodiments of the invention, the power source and/or other circuitry of the card is located on holder 110. In one example, only the battery or a main battery is on the badge holder. A secondary battery on the card itself may be provided for limited use when the card is removed from the holder. Possibly, the badge holder includes circuitry for receiving and transforming transmitted power, such as RF, light, ultrasound or LF magnetic fields, or local power, such as inertial motion of flexing of the card, into power for recharging the card, shown generally as reference 116. Alternatively or additionally, a microphone, loudspeaker and/or amplification circuitry, may also be provided on the badge holder, indicated generally by a reference 117. Possibly, the card has a limited range and/or other functionality, which are enhanced when the card is placed in the badge holder. The communication between the card and the badge holder may consist of only power connections, digital data connections and/or analog data connections, showed generally as reference 114. This communication is preferably wired. Alternatively or additionally, contact-less communication may be used, for example inductive communication.

Card Position Determination

In a preferred embodiment of the invention, spatial angles, and/or one- two- or three-dimensional relative positions of a smart-card and an electronic device (such as a computer or an input or other peripheral) are determined by analyzing various characteristics of sounds received and/or transmitted by the smart-card. In a preferred embodiment of the invention, a relative location of a pulsing sound source and a plurality of microphones is determined by solving time of flight equations. Alternatively or additionally, other methods known in the art for processing acoustic signals or for non-acoustic based methods of position determination may be used. Thus, the relative location of a smart-card or an ID card (described below), relative to another electronic device, may be determined and used to control the operation and/or cooperation of one of the above devices. In an exemplary use described below, the position of a smart-card relative to one or more finger-worn input devices is determined, using acoustic or non-acoustic position sensing methods. An exemplary non-acoustic positioning method is an inertial positioning method, such as using MEMS inertial sensors, for detecting acceleration (and by integration velocity and position) of a smart-card and/or of the finger devices in space.

Alternatively or additionally, the smart-card may use its ability to send and receive acoustic signals as a rudimentary radar. In a particular application, the card tracks the distance to the device it is pointed at, e.g., a reader, to verify that it is within a prescribed range and/or angular range. Possibly, a lower power setting may be used for shorter ranges. Alternatively or additionally, the user may be instructed to turn the card. In some applications, a user may be required to rotate the card in a measured manner and/or the card may use phased array and/or other types of non-scalar control of the smart-card transmission and/or reception antennae.

Applications and Implementation Details

Various applications implementing the smart-card technology described above are described below. Some of these applications may also use other, known, smart-card technologies.

A feature of some embodiments of the invention is that a card can be used for transmission over medium distances, such as 0.3-20 meters, more preferably, between 2-10 meters or about 7 meters.

Speech Input and Output

In a preferred embodiment of the invention, the acoustic transmission capability of the card is utilized for speech output. In one exemplary embodiment, the output is used to provide details of a transaction being performed, especially amounts, the product purchased and the identity of the vendor. Such details may be especially useful for preventing fraud in electronic-commerce, in which the user of the card may not be aware of what purchase is being recorded.

In another exemplary embodiment, the output is used to provide feedback to a user on card functionality, for example to explain why a transaction is problematic. In another exemplary embodiment the card is used as a speech input and/or output converter for an existing device, such a as PDA. Thus, the card can receive voice commands from a user, convert them to PDA commands which the card transmits to the PDA, preferably using audible or ultrasonic transmissions. Responses from the PDA are preferably received by the card and then outputted to the user using a voice output. Thus, a user can be assured of a single interface to many complex electronic devices. In some cases, the quality of speech generated by the card is low, so that card transmits an indication of the desired speech to a computer or other electronic device, which device converts the indication into audible speech. In a particular embodiment, the indication comprises a compressed and/or frequency up-shifted version of the speech sounds.

Speech input by the smart-card may also be utilized for authentication purposes, for example a user verifying a purchase, which verification can be stored on the card or transmitted to a remote location. Such a verification is optionally encrypted or digitally signed by the card, utilizing methods known in the art.

Alternatively or additionally, the card uses speech to make announcements to the user, for example, reminders for meetings. Alternatively or additionally, the card may be used to play downloaded sound files, for example speech or music.

Alternatively or additionally, such a card may be used as a help card for various electronic appliances which have the ability to communicate with such a card. Although the help is preferably provided by the card itself, in some embodiments, the help is provided by a computer, for example by the card causing a browser executing on an associated computer to present a particular WWW page to the user, based on the required help. The help may be context-sensitive help, for example based on an estimation of the device state by the card or based on a reporting of the device. Alternatively, a user may operate an input interface of the card to provide a specific help section. In some cases, for example as described herein, a card can read the identification of a device component, for example using a bar code.

Use of Card for Electronic Wallet

It should be noted that such an acoustic smart-card may also be used as a customer card, as well as for an "electronic wallet", since information about the card holder can easily be retrieved from the card. Also, it is simple to transmit information to the card. More detailed applications are described below.

Piracy Protection

A software-piracy protection method in accordance with a preferred embodiment of the invention comprises a passive ID tag which responds to an interrogation by low frequency RF or ultrasound. Such a tag may also have stored thereon various information, such as an identification of the software purchaser. In one example, such a tag is attached to the case of a software CD, such that the software will operate only if the computer on which it runs can interrogate the CD for a particular code, using ultrasonic or sonic signals. Alternatively or additionally, the ID tag may be attached to the CD itself and/or attached to (or integrated with) an implement used for interacting with the software, for example a toy implement. Alternatively or additionally, the tag may be permanently attached (such that removal will damage it) to the case and/or monitor and/or other internal or external elements of the computer. Alternatively or additionally, the ID tag is plugged in as a pass-through hasp, which possibly does not interact with the data lines which pass through it at all, but may use power from the power lines. Rather, the authentication of the software uses acoustic communication between the hasp and the microphone and/or speaker. Alternatively or additionally, the tag may be mobile, to allow a roaming user to use software at remote locations. Alternatively to protecting software, such a method may be used to protect an easily stolen device, such as a PDA or a laptop computer, which can use their internal speakers and/or microphones to detect the proximity of a required ID tag.

Authentication Using a Smart-Card

An authentication system in accordance with a preferred embodiment of the invention preferably uses a computer for authentication. In a preferred embodiment of the invention, a user may be authenticated by the computer interrogating a smart-card (or smart ID card or badge) of the user and then listening for a suitable response from the card using a microphone. In a preferred embodiment of the invention, the computer uses the detected sound to determine attributes of the card, for example its distance from the computer. Alternatively or additionally, to responding to interrogation as described above, the smart-card may respond to an ambient room sound (for example an ultrasonic wave or a DTMF tone from a computer) with an ID code. Alternatively or additionally, a user may enter a code into a computer by having the smart-card transmit the required sounds, for example ultrasonic waves or DTMF and allowing the computer to receive the DTMF tones using the computer's microphone. Optionally, such ultrasonic waves also utilize a DTMF-like logic of simultaneous transmission at a plurality of ultrasonic frequencies, to indicate selected data values Alternatively to acoustic-based interrogation, the interrogation (or ambient field) may be RF based.

Preferably, as indicated above, the smart-card responds with acoustic signals, possibly ultrasonic signals. Optionally, the smart-card uses the energy of the interrogation signal to generate the response signal. Alternatively or additionally, the smart-card is interrogated using a smart-card-specific code. In a preferred embodiment of the invention, such a smart-card is used for computer log-on authentication. For example, when a wearer approaches a computer, the computer automatically logs on to that user. Alternatively or additionally, the computer may require the proximity of the smart-card in addition to standard log-on procedures. Alternatively or additionally, the computer may periodically interrogate the smart-card, to insure that the card wearer is still nearby. It should be noted that a lower quality connection may be suitable for maintaining the "logon", while a higher quality/bandwidth connection may be required for the initial log-on. By using a periodic signal, synchronous detection may be used, which may be more robust in the presence of noise. In other embodiments, the smart-card transmits periodic signals, possibly synchronized to a clock signal from the computer, to allow some type of synchronous detection.

Alternatively or additionally, the computer may interrogate the card for user specific information, for example a voice ID or personal information stored on the card. The computer can thus query the user for a voice response and compare the response (voice print and/or contents) to confirm the card wearer is a designated card wearer.

In some preferred embodiments of the invention, the card uses speech input for identification. In others, the card detects a response to a query by the absence, quality, number and/or other features of sounds, so no real speech recognition or matching is required.

A user may wear two cards, one for general authorization and one including personal information. A computer may interrogate one or both cards as needed.

The card can respond at once or at a delay to the interrogation signal.

Additionally, the response by the card may be at a same or different frequency as its interrogation.

Various characteristics of the response may be analyzed by the computer to determine, for example, a distance from, position to, velocity of motion and/or other spatial attributes of the card. In some embodiments, the card (or the computer) detects both an acoustic pulse and an RF pulse generated in association with the acoustic pulse. By comparing the amplitude of the two pulses and taking into account the directional characteristics of the acoustic and/or RF antenna, information regarding the relative orientation of the computer and the smart card can be estimated. By comparing the detection time of the two pulses, the distance between the smart card and the computer can be determined, base don the difference in velocity between the RF and acoustic waves.

In a preferred embodiment of the invention, the card responds to an interrogation with an identification code. Alternatively or additionally, the card modulates its transmission with an envelope, which envelope preferable serves as an identification code and/or for transmission of information regarding a status of the card, for an operational mode of the card. In some cases, the computer relays the response of the card to a more remote object, for example over an Internet. For identification purposes, the card may send an ID code even without prompting from the computer, for example periodically or by a user pressing a button on the card (or by flexing the card).

Challenge Response Authentication

In a preferred embodiment of the invention, a smart-card is used to implement a challenge response mechanism. The smart-card receives the challenge from a PC by means of acoustic communication, optical communication or other means, for example as described herein. After receiving the information, the smart-card calculates the response and shows it on an LCD screen or plays it's speaker. Alternatively, the device sends an audio file to the computer to be sounded so the user can hear it. The user then enters the response into the PC, e.g., by keying it into the PC as his current password. Thus, in some embodiments only a speaker (or only a display, such as a screen of LEDs) is required on the challenging computer.

Multi-Dimensional Authentication by Smart-Card

A smart-card can be used to provide authentication in additional ways to those described above. Possibly two or even three of the following security elements can be used: "who you are"—i.e., an identification of the requester, for example by a handwritten signature, a voice print or other biometric information, "what you have" i.e., the card itself which can include a private key, and "what you know, i.e., a password. In one exemplary embodiment, the "card" is implemented using a pen, which, using localization techniques as known in the art, can be used to detect handwriting. Alternatively or additionally, a gesture using the card is accepted instead of a signature.

The password can be stored on the card. Possibly, a card stores a plurality of passwords and is used for single source logon (SSL) or for providing passwords to multiple sites, as needed. Possibly these passwords can be used to give privileges to a card's owner in the form of better Internet service (speed of connection, limits). For example, a manager can come to his employee desk, wave his card and the Internet connection will be better. Alternatively, various security restrictions may be alleviated, using the manager's restrictions instead. It is noted that this does not require logging on to the computer (although it is possible) by the manager. Rather, the computer recognizes the manager even while it remains logged on to the other user.

Biometric Validation Using a Smart-Card

As indicated above, in a preferred embodiment of the invention, the card includes biometric capabilities, for example voice, handwriting, fingerprint and image recognition (retina, face) information. In some cases, the card will only include the relevant biometric signature while the comparison and/or data acquisition are performed elsewhere, for example using a camera for image acquisition. In other cases, the card will do the data acquisition and/or processing as well.

In a preferred embodiment of the invention, when doing a deal, a user is requested to say his name or another phrase. A hash of the information is then signed by the card with the date and time and other details of the deal, and the information and the signature are transmitted to the supplier. When a user attempts to repudiate a deal, the supplier sends him the signed voice print and the user can verify that the deal is recorded. The mechanism can be supplemented with a soft voice verification technique on the card. This mechanism can be considered, to some extent, to be similar to handwritten signatures on credit card purchases.

An alternative method of authentication uses one-way communication between the card and a computer. The card transmits authentication information (for example a one-time code) to an Internet server and that server signs on the transaction.

Alternatively or additionally, a "biometrics authority" is provided, which authority knows the biometrics signatures of people and gives verification on signatures by request. This authority may be accessed, for example by Internet or by telephone. The information sent to the authority can be asymmetrically encrypted.

Smart-Card Transmission Over a Network

Figure 4A:
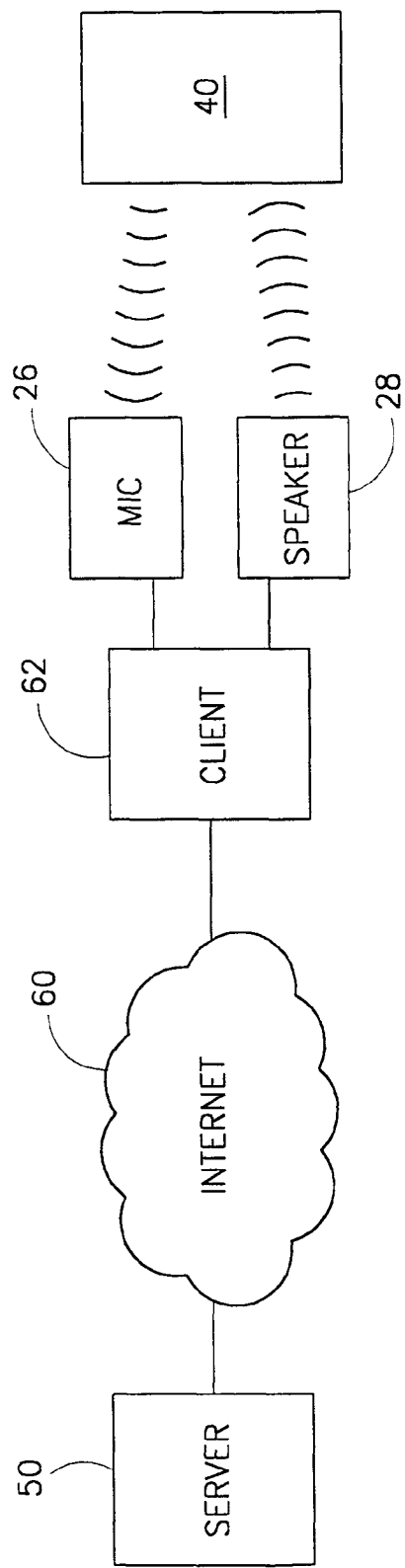
FIG. 4A is a schematic illustration of an Internet transmission pathway for sounds, in accordance with a preferred embodiment of the invention.

FIG. 4A is a schematic illustration of an Internet transmission pathway for sounds, in accordance with a preferred embodiment of the invention. When a smart-card 40 (or interrogated badge) transmits information-carrying sounds to a computer, these sounds may be analyzed on the computer. Alternatively or additionally, the sounds may be transmitted from the computer to a remote computer, where they are analyzed. In a preferred embodiment of the invention, a local client computer 62 receives sounds and transmits them over an Internet 60 to a server computer 50. Alternatively to using an Internet, an Intranet, a LAN, a WAN or another type of computer data network is used. Alternatively or additionally, at least part of the transmission path may comprise telephone lines, for example for carrying unprocessed sound signals from the card. It is noted that there exist standard protocols for transmitting sounds over networks. Thus, there is little or no need for changes in the hardware and/or software configurations of the communication pathway, especially not of client 62. The pathway can also work in the other direction, for example, when a smart-card requests downloading of data or software from a remote server, as a card-understandable sound file, or when the server interrogates the smart-card. It is noted that playing of sound is also supported by standard Internet protocols.

Alternatively or additionally, a smart-card may serve as an interrogated ID card that is used to control access to and/or billing of usage of an Internet site. In one example, whenever a user requests a service from the Internet, the existence of a local smart-card is ascertained. Billing information is preferably transmitted to the card. Preferably, the card is interrogated periodically (possibly by a third party), preferably over the Internet or a telephone connection, for the existence of charges. Alternatively, a debit card may be used, in which the available balance is stored on the smart-card itself, so no periodic interrogation is necessarily required.

In an example of a financial or business interaction over an Internet, one or more of the following three levels of security may be achieved. First, the presence of the card, which can be required by local and/or by remote software. Second, confirmation of the card wearer identification using personal information (such as voice or signature as described above). Third, an identification of the calling computer (which should preferably match the wearer profile and/or information stored on the card).

Communications between the smart-card and the remote computer 90 or other electronic device) may include encrypted communications, for example using RSA, DES, triple DES or TEF encoding or other public-key algorithms. Alternatively or additionally, the communication may use DTMF or DTMF-like tones. Alternatively or additionally, such communication may be used for telephone calling cards. Alternatively or additionally, such communication may be used for transmitting credit card information. In a preferred embodiment of the invention, a credit card includes a sound output (optionally encrypted). Thus, a user can "swipe" his card at any electronic device which includes a microphone (optionally a speaker, for two way communication) and suitable software/hardware, for example a home computer. Possibly, swiping software may be downloaded as a Java applet.

Generally, any type of smart-card interaction, for commercial and/or for personal uses may be implemented using the acoustic transmission methods described herein.

Use of a Smart-Card in a Store

In a preferred embodiment of the invention, a smart-card is used for purchasing services and/or goods in a store. In one example, shown in FIG. 4B, a person enters into a restaurant, carrying a smart-card 120. This smart-card may be used for several activities in the restaurant, for example, contacting a waiter's communicator 122, selecting a free table (based on a list of tables transmitted by a central computer 124) and/or reviewing a menu and "today's specials" also transmitted by central computer 124. Possibly, some of this information and other information, such as average waiting time, current line length, average meal costs, specific dish costs, delay until a particular dish is ready, dishes which are out of stock and in general any question that a customer might ask a waiter, may even be answered when the client is outside the restaurant (preferably using a speaker outside the restaurant). The client may query for this information or it may be continuously presented. It is noted that some types of query responses require a control of details and numerical information which are beyond the ability of most waiters (but not of a central computer).

Once the customer is seated and has made his selection from the menu, the client can track the progress of his dish, for example by communication with a kitchen computer 132. In some restaurants, the client is a regular customer (possibly the card is a "member's card") and the card may be used to place the order. Possibly, the client can order his "usual". Alternatively, especially if the smart-card includes a display (or is implemented using a PDA), the client can order directly using the card. In some cases a card may not have a sufficient transmission range and one or more local transducer, such as on the table or on walls or ceilings of the room, are provided. These transducers may be replaced by a remote loudspeaker/microphone system for the central computer. In some cases, the smart-card (possibly RF rather than acoustic) may be used at a medium distance, for example, 1, 5 10 or even 15 meters between the card and the transducers. Alternatively, the card may be used at a short distance, for example, 0.5 meters or even at contact or near contact distances, such as when a transducer is placed at each table. The card may be designed to work only a short distance, for example by its having a reduced amplitude. Alternatively, the card logic may set the allowed distance, such as on a permanent basis or in response to the instant constellation of smart card(s) and computer At the end of the meal, the bill total and/or the bill details are downloaded to the card. Using the card, the user can authorize payment and/or add a tip. The payment authorization is preferably transmitted by central computer 124 to a remote credit card company 126 for verification. Possibly, the smart-card instructs the central computer to print out a paper slip to be signed. However, a digital-type signature is preferred. In an electronic wallet situation, no credit card company is used. Instead "cash" is withdrawn from the smart-card.

In a store embodiment, or in a display-case type restaurant, the smart-card may also be used to interrogate certain displays for further information, for a demonstration or for ordering.

Smart-Card-Smart-Card Interaction

Figure 4B:
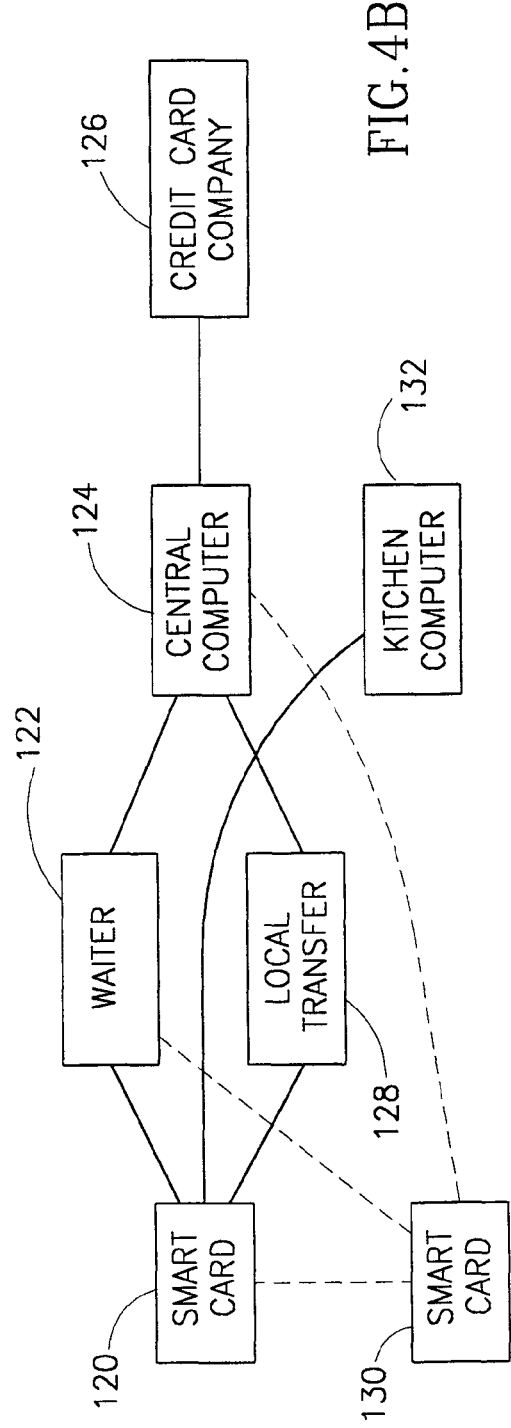
FIG. 4B is a schematic illustration of usage of a smart-card in a restaurant setting, in accordance with a preferred embodiment of the invention.

In many situations, there will be more than one active smart-card in a restaurant at a single time. In FIG. 4B a second smart-card 130 is shown. In a preferred embodiment of the invention, smart-cards 120 and 130 coordinate so that they do not both transmit or receive (to same and/or different computers) at a same time. In one example, the central computer assigns time, frequency or coding (CDMA) slots to identified cards. In another example, a distributed algorithm, such as an ALOHA algorithm, is used to avoid collisions.

In a preferred embodiment of the invention, two smart-cards can directly communicate, for example to exchange business information or "business cards". A particular situation is at a technology show where several persons from a single company will each view part of the show and interrogate information from displays using their smart-cards. At the end of the day, these persons will preferably consolidate their finding by the smart-cards exchanging information or by downloading the information from the smart-cards to a central computer. Optionally, a mediating computer may be used to assist communications between the smart-cards.

Methods for a Smart-Card Tapping into a Computer

Figure 5:
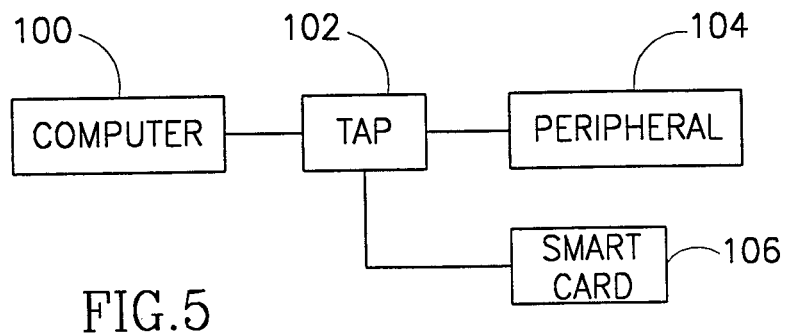
FIG. 5 is a schematic illustration of a method of tapping into a computer, without requiring complicated installation of hardware, in accordance with a preferred embodiment of the invention.

Alternatively or additionally to using acoustic signals to communicate with a computer, a smart-card may tap directly into the computer. FIG. 5 is a schematic block diagram of a communications tap 102 for a computer 100, in accordance with a preferred embodiment of the invention. One problem with computer communication is setting up the hardware and software for communications. In the configuration of FIG. 5, a tap is preferably placed on communication line to an existing peripheral 104. Thus, a user may not be required to even access a back part of a computer, let alone a computer's inside. A smart-card 106 preferably sends and/or receives signals via tap 102. Additionally or alternatively, smart-card 106 may use one tap for receiving and another for sending. Possibly, a smart-card uses taps only for one direction of communication.

In a preferred embodiment of the invention, the tap is placed on a cable to a printer, a network cable, a camera cable and/or a SCSI connection. Additionally or alternatively, the tap is placed on a serial cable, for example a mouse cable. Additionally or alternatively, the tap is placed on a modem line, for example on a telephone line or by plugging the tap into another telephone socket, to be received by the modem. Additionally or alternatively, the tap is placed on a game controller line. Additionally or alternatively, the tap is placed on a loudspeaker line. This type of tap can detect signals which cannot be reproduced by the loudspeaker, for example very high frequencies. Additionally or alternatively, the tap is placed on a microphone line, possibly using the microphone line and/or the microphone itself as a sonic, ultrasonic or non-acoustic antenna (e.g., RF). Additionally or alternatively, the tap is placed on a display cable line.

In a preferred embodiment of the invention, the tap includes an electro-magnetic coupler, which can induce signals in a cable which passes through or near the tap. Additionally or alternatively, the tap can detect signals in the line and transmit them to smart-card 106. In a preferred embodiment of the invention, the signals are at a different carrier frequency and/or signal frequency than the usual signals passed along the line. Additionally or alternatively, the signals travel in an opposite direction (input signals on an output line, such as a printer or output signals on an input line, such as a mouse). Additionally or alternatively, the signals encode information which information is detected and removed from the data stream in the computer. Additionally or alternatively, the signals are asynchronic on a synchronic line. Additionally or alternatively, the signals are transmitted only when no signal is expected by the computer and/or the peripheral. Alternatively or additionally, and especially for input and output cables, the smart card may inject an input into a cable, such as a microphone cable, to mimic actual reception of the sounds by the microphone. Conversely, a smart card can detect signals on a speaker wire, instead of acoustically receiving the sounds.

Alternatively to communicating with the computer, the tap may be used for operating the peripherals. In one example, a smart card is coupled to a speaker cable so that the speaker generates sounds desired by the smart-card. In another example, the smart card detects signals on a microphone wire, instead of supplying a microphone on the card. The sounds thus generated for the smart card may be used for communication with a same or different computer or electronic device, using acoustic communication methods described herein.

In an alternative embodiment of the invention, a piezoelectric actuator (or other vibrating element) is connected to a mouse (or a microphone). The actuator causes the mouse to shake at an amplitude of one or two screen pixels (or less) and the shaking is detected by software in the computer as signals from the smart-card. A return signal may be transmitted to a tap associated with the actuator, along the serial cable, with the signal preferably being coded to be recognized by the tap and/or ignored by the mouse.

In an alternative embodiment of the invention, smart-card 106 sends signals to computer 102 using a tap to cause virtual or physical pressing of keys on a keyboard attached to computer 100. Preferably the key used is a shift key. Additionally or alternatively, signals from the computer are detected by detecting illumination of LEDs on the keyboard, for example a "Num Lock" LED. In an example of virtual pressing, the tap interacts with magnetic contact sensors in each key. Alternatively or additionally, the tap induces signals indicative of key presses in the keyboard cable. Alternatively or additionally, the tap physically presses the keys.

Alternatively or additionally, the tap detects illumination of other LEDs on a computer, for example power, sleep, CD-ROM and/or hard disk LEDs. Alternatively or additionally, the tap detects information transmitted via noise or vibration generated by activation and/or modulation of the activity of mechanical components of the computer, for example diskette drives, disk drives and CD-ROM drives. Alternatively or additionally, the tap detects an electromagnetic signal generated by power surges to the devices, for example a CD-ROM when it is powered.

In a preferred embodiment of the invention, a tap "learns" the electromagnetic and/or acoustic profile of a particular computer and also learns the effects of various commands on this profile. When a computer desires to communicate via a tap, it preferably modifies the profile using those commands which are determined to have the greatest, most noticeable and/or fastest effect on the profile.

Additionally or alternatively, tap 102 comprises a transducer which plugs into a parallel port, a serial port and/or is optically coupled or placed near an IR port. Preferably, the transducer is a pass-through transducer, through which a printer and/or other peripherals may communicate normally with a computer.

In a preferred embodiment of the invention, the tap and/or transducer can automatically detect which type of cable is tapped or port it is connected to. Preferably, such detection is made by analyzing amplitude, frequency and/or synchronization of signals passing through the lines. Additionally or alternatively, the computer detects which line is tapped, by detecting particular inferences on that line. Alternatively or additionally, software on the computer sends test signals along the lines, to be detected by the tap. Preferably, the tap can detect these signals even without being programmed with the type of line on which the signals are transmitted. Alternatively, when a tap is used, a configuration program is run so that a user can define to the tap and/or the computer what is being tapped.

In a preferred embodiment of the invention, a smart-card directly taps the computer, for example using a coil embedded in the smart-card to detect signals being transmitted over data lines.

In a preferred embodiment of the invention, suitable software is installed on computer 100. Preferably, the software is self installing, for example from a zipped file or from the Internet as a downloaded software component. Preferably, the computer is not used for any other use while smart-card 106 is communicating with it. Additionally or alternatively, the software can differentiate between "regular" signals and signals related to the tap. In one example, a provided keyboard driver may detected special codes and/or data sequences on the keyboard line and remove them from the received data, passing only the rest of the received data to an operating system of computer 100. Additionally or alternatively, a provided mouse driver may detect spurious and/or small mouse movements, and recognize them as being tap related signals. Additionally or alternatively, a printer driver can recognize signals on the printer cable as not coming from the printer but from a tap. Additionally or alternatively, data sent to the tap is preferably sent as data which will be rejected or ignored by the peripheral, for example having incorrect parity settings or other intentional errors.

In a preferred embodiment of the invention, the "non-standard" signal received on the computer is used to control other devices connected to the computer, by the smart-card or to perform control or verification functions as described above.

Card for Interaction with a Magnetic Drive

As described above, a card may draw power from a diskette drive. Additionally or alternatively, the card interacts with the head, for example a diskette index read head, for communication with a host computer of the drive. Possibly, the card may interact (for communication purposes) with magnetic read and/or write heads even if the card is not inserted in the slot. Preferably, the card includes magnetic-field sensitive sensors, such as GMR sensors, as exemplary embodiments of data input 49 (FIG. 3B). Such GMR sensors may also be used to allow the smart-card to read magnetic information, such as on magnetic strip cards, by scanning the strip with the data input of the card adjacent the strip. Alternatively or additionally, such a GMR or other magnetic sensor may be used to allow the card to eavesdrop on signals transmitted via computer cables, for example as described below with reference to tapping. Alternatively or additionally, the card includes an RF or magnetic field generating unit capable of affecting the read/write heads or coupled-with cables. For use with cables, the antenna may be extendible from the smart-card, possibly being operative to surround the cable, pierce the cable or be placed in proximity to the cable or inside a device casing.

Multi-User Performance Using a Smart Card

Figure 6:
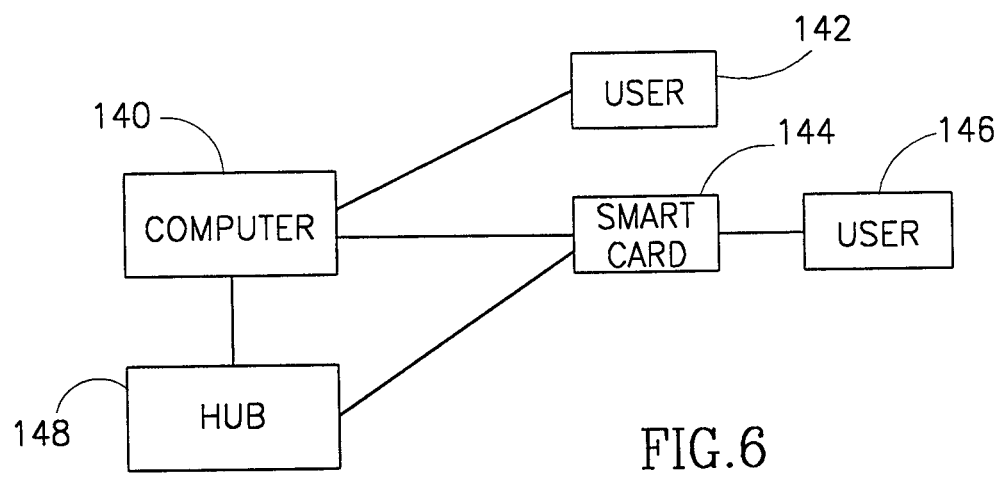
FIG. 6 is a schematic illustration of an unobtrusive computer checkup in accordance with a preferred embodiment of the invention.

FIG. 6 is a schematic illustration of an unobtrusive computer checkup in accordance with a preferred embodiment of the invention. A user 142 is using a computer 140. A user 146 wishes to interrogate computer 140, for example to determine the presence of a networking problem. In a preferred embodiment of the invention, a smart-card 144 (or other electronic device) can communicate with computer 140 using an acoustical- or a tap-channel as described above, without interfering with the activities of user 142. Alternatively or additionally, smart-card 144 may be used to interrogate an interface-less device, such as a hub 148. One advantage of acoustical communication for these uses is that they do not generate a considerable amount of RF interference and do not require major (if any) changes in a (significant) install-base of hardware. In a preferred embodiment of the invention, hardware devices, such as hub 148 and computer 140 continuously "hum" their status, so that the status can be discerned by eavesdropping on the hum, without needing to interrogate the hardware.

Exemplary Embodiment for Electronic Commerce

In a particular preferred embodiment of the invention, an electronic commerce system comprises:

(a) a computer (desktop/laptop/hand-held) with a regular microphone (built into a monitor or computer or external) or special sonic/ultrasonic microphone and at least one speaker;

(b) a card or other device which has an acoustic receiver, a processing unit, an acoustic transmitter and input and/or output filtration and amplification circuits;

(c) a communication protocol used by the card and computer;

(d) software on the card side;

(e) software on the PC side; and (f) a security scheme, integrated with the other components.

In the smart-card, the acoustic receiver can be a regular capsule microphone, or an ultrasonic type microphone, possibly specific for a particular frequency or frequency range used. Preferably, the processing unit used has sufficient power (a few MIPS), and includes some (on-chip or off-chip) memory, for example for storing and/or generating a cryptographic signature. A Microchips 12C508, 12C672 or higher processing unit is preferably. In some cases, special ultra-low power circuitry may be desirable. The acoustic transmitter can preferably generate a strong atmosphere wave. It is noted however, that only a small amount of power is required for short range transmissions. Additionally, the transmitter may generate waves in solids, for example to be carried by the case of the computer comprising the microphone.

In a preferred embodiment of the invention, the input/output filtration circuits comprise op-amplifiers with filters for specific frequencies for input and output, dependent on the communication protocol used. If non-audible frequencies are used, the filters should decrease power in audible frequencies, to reduce annoyance of a user An exemplary software for the smart-card demodulates the signals received and converts them to data bits, either by time domain analysis or by Fourier analysis. Thereafter, error checking is preferably performed. The received information may be decrypted (if necessary). Alternatively or additionally, the received information may be encrypted, verified and/or signed, in order to be stored in local memory. The local memory may comprise ROM, RAM, EPROM, EPROM and/or other types of memory as known in the art. Information to be transmitted may be encrypted before transmission.

An exemplary software for the PC receives a detected signal, filters it, and opens the protocol. Preferably, the software reduces errors using IIR Band Pass and/or low pass filters.

The received and filtered signal is then demodulated, into data bits, for example, by time domain analysis or by Fourier analysis. Data transmission errors are preferably corrected. Methods known in the art of modem-based communication may be used for smart-card communication in accordance with a preferred embodiment of the invention. The data may then be locally analyzed (by the local computer or smart card) and/or transmitted to a remote location, for example a seller's computer. In some embodiments, this software is written in an Internet Language, such as Java or ActiveX.

In a preferred embodiment of the invention, the acoustical detection uses the maximum resolution and/or sensitivity afforded by the microphone, i.e., going below the noise threshold as defined for audio uses. Alternatively or additionally, repeating and/or periodic ambient sounds are detected and removed or disregarded from the input signal. In a preferred embodiment of the invention, ambient sounds are characterized as such during a calibration step which may be performed periodically.

The receiver circuit preferably includes a narrow band amplifier, preferably with an automatic gain control (AGC). The circuit detects an audio signal in the relevant band, and then compensates the gain by the AGC to form a stable output signal with amplitude of approximately 2 Vpp. This analog signal is then fed into a comparator, which produces a square wave with the frequency of the analog signal. This signal can be processed digitally by a micro-controller. The analog signal can also be digitized by an A/D for more accurate processing in a more sophisticated microprocessor.

In an exemplary transmitting circuit, a speaker is driven by a FET. A capacitor is charged to full voltage after approximately 1 mSec, allowing a small amplitude of speaker driving signal at ignition, in order to make the signal inaudible.

The transmission from the PC can be from one or two Speakers, powered alternatively or possibly powered together, for example to increase the total power, to aid in noise cancellation and/or to aid in detecting echoes. Alternatively or additionally, to a speaker, transmission and/or reception of the computer can be from an acoustic transducer connected to a standard port or possibly tapping the computer, as described above. Thus, there may be no need for a sound card in the computer. Also, as indicated above, at small distances there appears to be an overlap between acoustic and electromagnetic signals both with regard to transmission and with regard to reception. Thus, possibly some of the signals are transmitted and/or detected using an RF antenna, or acoustic signal generation is detected using an acoustic antenna that detects an RF signature of the transmission generated by the computer. Alternatively or additionally, the RF is used as a backup for the acoustic channel.

Exemplary Security Scheme

In a preferred embodiment of the invention, the following security scheme is used: the card has stored thereon a private key of owner. A facilitator has public keys of all users and is accessible via an Internet or other means. In some cases the seller is also the facilitator.

In an exemplary embodiment, a user connects to a seller's site using a local computer, and decides on a purchase. He (or she) activates the card which in turn signals the local computer to transmit purchasing data (e.g., a catalog number) and a random number, back to the card. The card in return, signs on the data and the number with its private key and sends the signature back to the computer. The computer receives the signature and sends it to the seller. The seller then verifies the signature, for example using a locally stored public key or with the help of the facilitator. The supplier may save the purchasing data and signature for his proof of purchase. The facilitator can also check if the random numbers are really random or to supply such random numbers. In some applications, the random number is generated by the seller.

This scheme can use any known cryptographic method for electronic signature, for example RSA, Elliptic curve or methods which are not based on public/private keying.

In some embodiments, the card is used only for transmission of a purchase authorization, possibly without receiving any data from the computer. Possibly, such information is entered directly into the card, for example using buttons on the card. Alternatively, the card only transmits a "usage" authorization, which is unrelated to the particular purchase. Such an authorization is preferably a one-time, temporally limited authorization, which expires after a short time, for example 30 seconds. Replies from the seller may be locally stored on the local computer or the card for use by the card owner.

Display of Downloaded Data by Smart-Card

In a preferred embodiment of the invention, the seller and/or the facilitator can download advertisements and/or operating instructions to the smart-card, possibly as part of a purchase agreement. This is especially useful for devices that are programmed using sounds downloaded from the Internet. Some of the downloaded sounds may comprise an audio (or visual—for suitable devices) user manual.

In some embodiments of the invention, the card displays information visually and/or acoustically to a human user. This information may be for example a commercial or instructions of use. Although direct generation by the card is desirable, in some embodiments, the card instructs a computer with which it is communicating to do part or all the displaying.

Suitable Frequencies

In an exemplary smart-card circuit, the reception of a signal is via a miniature wide band microphone, and the transmission is via a low profile miniature diaphragm. The sound frequencies are in the range of 18 kHz to 22 kHz, in order to make the data transfer inaudible. However, lower (audible) frequencies can be used when the computer microphone has a poor performance, or when otherwise desirable.

Depending on the particular implementation various frequencies may be used, for covering the range between 1 Hz and 300 kHz. However, Preferably, low-frequency ultrasonic waves, such as between 16 kHz and 100 kHz, preferably below 80 or 50 kHz and preferably between 18 and 30 kHz are used. Similar frequencies are expected to be used for at least some of the RF embodiments described herein. It should be noted that the range of available frequencies may be limited if ultrasonic frequencies are used, due to degraded capabilities of the computer sound card, microphone and/or speaker.

It should be noted that ultrasonic frequencies can be also be generated indirectly, for example, by the interference of sonic waves (at same or different frequencies) from two loud speakers and by various quirks of loudspeakers and their driving circuitry, such as non-linear response. Thus, in some cases inaudible ultrasonic waves can be achieved at a frequency which the sound card, the transport layer and/or the source cannot handle. Also, as some sounds in the computer are not caused by the speaker (e.g., the hard disk and CD-drive), some attainable frequencies and sound envelopes may be unrelated to the sound card used.

Use of Speaker as a Microphone

In many cases, a speaker is available for a computer but a microphone is not. In a preferred embodiment of the invention, a speaker is used as a microphone.

Preferably, the speaker is connected to the microphone port and/or line in port of a sound card, possibly through an adapting unit. Apparently, many speakers can operate as a microphone if they are not connected to a power source. Preferably, an adapting unit is provided, for example to serve for buffering, switching (between microphone and speaker functions) and/or for amplitude protection. In one embodiment, the speaker is connected in parallel to both microphone and loudspeaker channels of a sound card, with electronic protection for the microphone channel so that the power to the speaker does not harm the microphone and/or the microphone channel.

Communication Protocol

In a preferred embodiment of the invention, the detection of a signal by an electronic device, computer and/or smart-card comprises a binary detection of the signal, e.g., an on/off state. Additionally or alternatively, more complex signal detection and analysis techniques may be implemented, for example, detection of signal amplitude, frequency, frequency spectrum, Doppler shift, change in amplitude and/or duration, detection of a number of repetitions, voice and/or other pattern recognition in the sound. Various information encoding protocols may be used, including AM, FM, PSK, FSK, QPSK, pulse length encoding and/or combinations of the above. The transmitted signal may include, for example, one or more of information about the sending device's activities, location, environment, nearby devices, locally sensed information, logic state, readiness, requests for information and/or answers to such requests. Although pulsed wave forms are preferred, in some embodiments of the invention, continuous wave forms may be used. Preferably, digital encoding methods are used, however, in some embodiments, analog encoding methods are used instead or in addition.

In a preferred embodiment of the invention, periods of silence are provided between data bits in protocols other than on-off keying. In one example, an FSK protocol is provided with silence between the frequency pulses. Preferably, the duration of the silence is sufficient so that echoes (or other artifacts) from the original pulse do not overlap with a next pulse. This period may be fixed, for example based on an expected geometry of the electronic devices and where they are used. Alternatively, the protocol may be adapted based on the instant echo situation. Alternatively or additionally, the pulse duration may be modified to overcome noise, echo and/or other transmission problems. In a preferred embodiment of the invention, a few calibration pulses are first sent to determine a desired silence and/or pulse duration. Possibly, different such durations are used for the two communication directions.

Signal Processing

In a preferred embodiment of the invention, the microphone of the smart-card (and/or of the computer) comprises a directional microphone, for example a stereophonic microphone or a microphone in which the frequency response is spatially non-uniform. Thus, the direction of a sound source can be determined if the relative amplitudes of the constituting frequencies are known.

In some cases one or more of the following problems may be encountered, including: echoes, interference, and, at higher frequencies (>10 kHz) problems of directionality and weak reception. In addition, many microphones and speakers behave badly or in an unstable manner at these frequencies. In a preferred embodiment of the invention, the received sound signals are processed using known signal processing techniques, such as filtration, equalization and echo cancellation. Preferred frequency band types include a single band, a wide band spread-spectrum and frequency hopping bands. Preferred protocols utilize one or more of start-stop synchronization bits, and constant and/or variable length messages. Possibly the card and/or the PC include logic for determining the exact frequency used for transmission, for example to correct for frequency hopping or for frequency shifts caused by inaccurate manufacture of environmental effects. Error detection methods may be used, for example, CRC (preferably 32 bit), Parity, Checksum, Blowfish, Hamming Codes, Retransmit/BCD Codes and Gray codes. Alternatively or additionally, error correcting techniques can be used, especially resending error packets and correcting using redundant information in the transmission.

The protocols may be implemented at various communication layers, as defined by the OSI seven layer model, including both low-level layers, such as the 1st, 2nd and 3rd and higher-level layers, such as the 4th, 5th, 6th and 7th.

Variations of Signal Processing

In some cases, for example if the receiver has a reduced computing capacity or if the sound card has a limited sampling rate, the incoming audio stream is sampled at less than twice the carrier frequency. However, a side effect of such sub-sampling, especially when there are no anti-aliasing filters, is that there may be confusion between audible and ultrasonic sounds. Thus, more complex processing may be required. In one example, synchronous detection or a more robust error detection method is used. Alternatively or additionally, a specialized waveform with unique time/spectrum characteristics is used, for example one that repeats itself at both 1 and 4 kHz after the down sampling. Thus, it can be better differentiated from the background.

Direct Digital Processing

In a preferred embodiment of the invention, the received signals from the acoustic element are amplified to TTL levels and connected directly into one or more data lines of the micro-controller. This "data" may be treated as binary sampled input and analyzed to determine characteristics of the received signals, for example using Fourier analysis. Thus, a high acoustic frequency can be detected and/or analyzed, without requiring a separate A/D. Preferably, the signal is amplified by various amounts, such as by several multiples of two and the amplified signal is connected in parallel to a different one of the data legs, so that multi-level signal detection is facilitated. Alternatively or additionally, one or more data lines may be directly (i.e., no D/A, but possibly with an amplifier or an isolator) coupled to a loudspeaker, to generate a "digital" acoustic output.

Automatic Data Entry from Smart-Card

One aspect of some preferred embodiments of the invention relates to the method of providing data from the smart-card to a vendor, via the Internet. Generally, data is provided either as part of a URL or by posting. The credit card information, digital signature and/or e-money information may use a special field. however, this may require rewriting software at many vendors. Also, an eavesdropper can more easily identify the sensitive information.

In a preferred embodiment of the invention, data to be transmitted is entered in a way which requires minimal changes of software at the vendor and/or at the user. Alternatively or additionally, the data is entered in a field which is designed for other data content, for example credit card information into a address field. This can be an existing field or a new "notes" field. Alternatively or additionally, the sensitive data is encrypted or otherwise modified, so that an eavesdropper does not recognize it as important data.

In a preferred embodiment of the invention, the data is entered, by a software on the user's computer which receives the input from the smart-card (or other input device such as a magnetic card reader), locates a suitable filed on a displayed form and then enters the data in that form. Alternatively or additionally, the software can identify a sound file or data file downloaded with the page that includes transaction information to be forwarded to the smart-card or other device. Alternatively or additionally, the software can identify the salient fields in the displayed form and present these fields to the smart-card.

In an exemplary process, a page is downloaded from a vendor, a user enters data in the page, a user authenticates the data and the data is sent to the vendor. The vendor may then forward the data to an account manager, such as a credit card company, for verification. In some cases, the vendor requests authentication after the data was sent and received by him.

The data may be entered manually, but it is preferably entered by the smart-card. In a preferred embodiment of the invention, the software on the computer identifies the fields which can be filled in with information from the smart-card or using other methods as known in the art. Alternatively or additionally, the software identifies any field which has a sufficient amount of empty space and inserts the required data (e.g., authentication data not field data) into the field. Possibly, the data is tagged. Alternatively, the vendor and/or verifier can recognized relevant data even without tagging. The vendor may analyze the data and forward only some of it to the verifier. Alternatively, he may send all the data to the verifier.

This type of software may be a Java applet or other downloadable network software. Alternatively, it may be software which is resident on the user's computer. Alternatively or additionally, the smart-card may download to software to the computer, providing the computer has or downloads from the Internet or other source, a bootstrap program for sound-input recognition and programming.

Alternatively or additionally to working at the browser level, the software can insert data directly into packet or as extra packets on a lower communication level, for example by masquerading as a TCP/IP stack.

The relevant fields to be filled in may be identified, for example by their name, by tagging by the vendor or even by identifying their content (e.g., the user's address can be recognized by the software as filling an address field).

Use of a Smart-Card to Authenticate a Display

In a preferred embodiment of the invention, protection is provided against "What-You-See-Is-Not-What-You-Get" computer viruses. These viruses alter the information displayed on the screen so as to deceive the user. In a preferred embodiment of the invention, a device is provided to assure a user that what he sees on the screen is what is intended to be shown (e.g., to confirm a digital signature by a trusted party).

An information verifying device in accordance with a preferred embodiment of the invention can read the textual and signature information from the screen directly by optical means (e.g., a CCD, for spatially encoded information of a photocell for temporally encoded information), or, it can connect between screen and PC (and decode the screen display electronic signals) or it can be a special monitor (connected to the computer display driver) that preserves a special viewing space for authenticated data and/or authentication data. This signature preferably includes the salient details of the proposed deal.

In addition, the device can read encrypted information by these same means. Thus, a user has a method of testing the validity of a signature provided by a computer even if he does not trust a particular computer. In the cases of a laptop including a video camera, a user can use the laptop to directly acquire and test the displayed image, instead of using a specialized device. Alternatively or additionally to an optical signature, an audio signature may be used, possibly being transmitted ultrasonically to the device, for example being a sound file (audible or inaudible) downloaded and sounded as part of a displayed WWW page. A preferred implementation is a smart card having an optical or acoustic input, as described herein.

Use of Smart-Card to Validate a Transaction

When doing an electronic transaction with a smart-card the user may not know what he is really agreeing to. For example—is the price being charges the same as the price being displayed? Is the vendor who he claims to be? A solution in accordance with a preferred embodiment of the invention is to have the smart-card (any type, not only acoustic) present transaction information directly to a user so the user can authorize it. In one example, the data is presented using a text to speech unit on the card. In another example, the card includes a visual display to display the information. In one example a card will announce (for example acoustically or visually) all critical aspects of the deal for example: amount, vendor name, date, which the card holder is requested to approve. It is noted that for wireless cards it may be easier to provide a text to speech unit than a LCD display because of thickness of the card. Alternatively or additionally, the information may be presented by a card reader device, if one exists. It is also noted that presenting the amount on a reader may not always be sufficient, unless also the vendor appropriating the money is properly identified. As suggested above, a user may then voice sign (add an OK and then sign using digital signature techniques) on the transaction and this signed voice agreement stored by the vendor.

In some embodiments, the vendor may be human, rather than machine. Human vendors may perform a transaction in person or over a network as well. A voice authorization from a vendor may be useful, for example for the comfort of the card holder or if a special discount is given to the card user.

Visibly Marked Revocation of Smart-Card

Many companies and/or institutions have wearable ID cards (sometimes with a picture) for restricting access of unauthorized people. Sometimes these cards are used also for computer access and/or for automatic doors and use smart-card and/or magnetic strip technologies. When these cards get lost, these companies are often helpless against a criminal who wants to use this card to enter the company. In a preferred embodiment of the invention, the card includes a material, such as a liquid crystal which changes its color and/or other optical characteristics, based on a voltage potential, and can stay at this state when the voltage changes or is cut-off. Possibly, the effect wears off and the card needs to be recharged. Possibly, the card is patterned using a special voltage pattern that is difficult to mimic without the recharging device. In a preferred embodiment of the invention, a card erases itself if it is not interrogated for a certain amount of time or if it is notified that it is invalidated (e.g., when it enters the company grounds after being lost).

Alternatively or additionally to the color changing, patterns of the colors change, possibly in a way which is imperceptible to a human and possibly in a way which is perceptible, for example to indicate the word "stolen". Alternatively or additionally, as described above, a card reader can tell the card it is revoked. Thus, a thief will be apprehended with a card that is marked "stolen". In some embodiments of the invention, the card will change color only after a short time, so the thief puts it back into his pocket, unknowingly, after he performs a transaction during which the card is revoked. Alternatively or additionally, the color changing material, an activation of a change in the color or a "revoked" stamp may be applied by the card reader. These marking methods may also be applied to regular magnetic cards and not only to smart-cards. In a preferred embodiment of the invention, the marking of a card as invalid draws a minimum or no current, so that the card will remain marked as invalid. Alternatively or additionally, the marking may be tied to the operation of the card. Thus, once there is not enough power to sustain the marking, the card ceases operation.

In a preferred embodiment of the invention, the patterned area is on both sides of the card (being controlled separately or as a unit). Alternatively, it is only on one side of the card. Although the patterned area may be small, it may, in some embodiments cover over 10%, 20%, 40% or 60% of the card surface. In some embodiments of the invention, the functionality of the patterned area may be provided by a multi-purpose display which can lock into a mode where it displays an indication, such as "stolen" and cannot be taken out of the mode except by a special coded command or by using a special unlocking device. Alternatively or additionally to visual display, the card may emit an audio indication, such as a hum, a beep or a speech segment, when the card is revoked or stolen. This indication may be presented continuously or it may be presented only when the card is in use. In visual display cards, the pattern changing may be applied only when the card is in use, for example so the thief is not aware of the problem.

Personalization of Interaction Using Smart-Card

The smart-card can store various types of personal information on it. In particular, this information may be used to control an associated computer. In one example, the computer is driven to display a certain Internet page, responsive to the presence of the smart-card and/or user input to the smart-card. These applications apply also to non-acoustic communication methods and even contact communication methods. However, acoustic communication has the benefit of not requiring dedicated hardware.

In a preferred embodiment of the invention, the card provides immediate access to certain web pages: when pointed to the computer, possibly with a click of a button or other control on the card, the card gives immediate access to a desired portal or trading site thus brings easy access, and customer loyalty. Possibly, the desired portal can be selected by manipulating the card itself, for example pressing a button thereon. In a preferred embodiment of the invention, determination of movement of the card is used, in interaction with the computer display, to allow a card user to make a selection. In one example, moving the card selects between different menu items on a display.

Alternatively, the card causes the display of a mail page or a personalized bank account, billing and/or shopping page. The identifying, password and/or personal information stored on the card may be used to select the page (or non-browser program), configure it and/or display it.

In another example, banners, deals offers and/or other advertising material presented to the user are selected and/or modified using the smart-card. In one embodiment, a software executing on the computer, possibly a JAVA applet downloaded with the page or a stand alone software, receives the information from the card and transmits it to the advertisement provider. The software may encrypt the data, to guarantee that only authorized or paying customers receive it or to protect the identity of the card holder.

Association of Information with a Smart-Card

As indicated above, in various preferred embodiments of the invention, the card can store user information on it. Some of the information can be mandatory and some optional. The information may include credit card details, credit limit, biometrics information, age, sex, occupation, hobbies, buying patterns, purchasing habits, and personality characteristics. Possibly, some of the information may be modified by the user. Alternatively or additionally, some of the information cannot be modified once written, at least not by the user. Some of this information can be sold or otherwise disseminated, preferably under privacy considerations, for example to merchants that fear frauds, and/or buyers or sellers in auctions. Possibly, such information is provided encrypted such that only a special provider can decrypt it, for example if fraud is attempted (e.g., during purchase or during the warranty period) or to facilitate recalls of damaged merchandise.

The information can be used to personalize the navigation of a user on the Internet and add specially made banners. Special personalized discounts/coupons can be offered according to this information specific to the user holding the card. Alternatively or additionally, this information is used to personalize, bill and/or authorize the purchasing of services, such as usage of software at a server computer and/or other types of network-based computing.

In one embodiment of the invention, a consumer information authority exists, that provides certain consumer information (such as age, credit limit, money spent, on which product categories, etc.) and guarantees its validity. This information resides on the card, and can be encrypted and signed, and can be sold to companies for discount to the user and/or for payment for the authority. The authority can also allow companies to save specific information on the card on a separate storage space, and can give different layers of service. The discount for the user can be in the form of micro-payments or other kinds of digital money, stored on the card, and being accumulated and being cashed, possibly at the authority web site.

In some embodiments, dissemination of information (stored on the card or off of it) requires an authorization by the card holder, for example in response to an e-mail from the authority or at the authority web site. In some cases, the user will initiate the transaction, for converting information into purchasing power. Thus, in contrast to standard smart wallets which store money or money equivalents, a user of a card of some preferred embodiments of the invention stores salable information on the card. In some cases, the stored information is other than that related to personal purchasing habits. For example, a card may include information retrieved from various WWW sites or exchanged with other card holders, for example identities and other personal information of persons at business meetings or parties.

Alternatively or additionally, the card can be used to track the browsing of a user at a competitor's (or the one who purchases the browsing information) site. The card can be used to track the browsing, for example by tracking purchases. Alternatively or additionally, the card may be used to authorize the authority to sell the information to the competitor.

Alternatively or additionally, in an on-line auction, the authority can provide or sell the card-holder's information, such as his IP address, e-mail address or his dependability (in previous actions and/or auctions). Thus, an auction house or an individual can rank the offers it receives based on the placers behavior at other auctions and/or purchase situations. Alternatively or additionally, the card-holder can auction out his information regarding purchases or WWW browsing behavior, to the various competitors.

Another type of information which can be stored in association with the card is account information. In a preferred embodiment of the invention, when a user interacts with a banner, reads commercials, reads advertising or "spam" mail from certain vendor(s) or participates in other types of e-exposure, the user receives a certain amount of points (or money) which are stored directly on the card. The user can then use these "points" to gain access to certain Web-pages/ information that is not accessed without these points. One type of transmitting the points is via a coupon attached to a spam-mail message. This "coupon" may be a coded text string. Alternatively, a sound file or an image pattern (spatial and/or temporal) may be used, which pattern or file can be read directly by the card from the computer, as it is displayed.

Use of a Smart-Card for Transfer of Valuables

In a preferred embodiment of the invention, a smart-card having direct access to the Internet, for example as described herein, but also possibly using an RF transducer system, is used to facilitate the transfer of money and/or other valuables (such as movie tickets, baseball tickets and discount coupons) over the Internet or other electronic communication means. These valuables can be transmitted, for example, as sound or text files using various available means, such as email, browsing, messaging services such as ICQ and "instant messenger". When the smart-card is then used to redeem the valuable, the redeeming computer does not need an Internet connection. Further, in some embodiments described herein the point-of-sale redeeming device does not need a reader. Rather, a microphone is enough. In some devices, the RF from a computer speaker can be used to transmit information to a RF smart-card. A microphone may be used to detect modulations of RF amplitude from the card.

Use of a Smart-Card in a Multi-Vendor Situation

A particular implementation of a smart-card is in a mall shopping situation. In some cases, the card is constantly receiving probes from various nearby sources, for example ultrasonic or RF probes. Responsive to such a probe, the card can indicate to a user that a nearby shop is offering a discount. In one example, a mall-wide (or super-market wide) transmission network transmits targeted offers to card holders. Possibly, the transmission is not targeted and the card itself selects which offers to display. In some embodiments, the card is embodied using a user provided smart-card having mainly information and a mall-provided reader that receives the transmissions and/or displays the offers. Possibly, a user can use his card to interact with the mall network, for example to analyze offers or to play award-giving games. The mall-wide network is preferably embodied using existing wiring, for example using acoustic encoding over the announcement system. Additionally, by tracking the location of a particular user, a mall-wide system can make an offer to a customer when he is deemed to be near a certain store. Alternatively or additionally, if a user has entered a store, received a quote or otherwise shown interest in a product and is then about to leave, the store computer can send him an offer or a discount. A discount may also be offered if a card holder is seen to be window shopping—moving slowly right next to the store and/or exhibiting changes in walking patterns near the store.

A smart-card may be the initiator of the commercial interaction. Thus, the smart card can advertise what items the card holder is interested in buying and/or what price he is willing to pay. any store willing to match those terms can respond. Alternatively, the store computers may send a probe to a nearby smart card to see what the card owner is interested in purchasing.

In some embodiments of the invention, the transaction may be completed with the smart card without the card user ever entering a store, for example using a mall-wide speaker system.

In another situation, a trade show, a card can be used to exchange information between people, for example registering and exchanging business cards or catalog information, to display personalized commercials on the card or on a nearby screen or speaker and/or to inform the card holder about nearby booths. The information on the card and/or the advertising information can then be downloaded to a PC and stored thereon.

Alternatively or additionally, such a smart-card may be used as a local pager at such a store or exhibition, especially if cellular communication is blanked out at the location. Alternatively or additionally, the card may be used to provide an indication that a user has incoming mail. Alternatively or additionally, the smart-card may perform calendar functions, such as reminding about meetings. The preprogrammed calendar information can be received from a PC using a scheduler program such as Microsoft Outlook or Sun's Star-Office.

Use of Smart-Card for Personal Communication

In a preferred embodiment of the invention, the smart-card is used as a pager. In one embodiment, computers in an office can locate a smart-card by local interrogation and then a message may be broadcast to a nearby telephone or intercom or using a nearby computer's loudspeaker. Alternatively or additionally, a visual message may be displayed on a computer screen (which is known to be at a location at which the ID smart-card is located) to notify a user of the computer that the user (or somebody in the room) is being paged. In another embodiment, a computer may be used to transmit information to the smart-card which will itself generate an alert to the user, for example by vibrating (e.g., by electrifying the piezoelectric film), by making a sound or by displaying a text and/or graphic message. In another embodiment, a telephone network, optionally a digital network, is used to generate and/or receive ultrasonic signals which can be used to communicate with a smart-card. A narrow bandwidth system, for example an analog system may be used if audible sounds are used.

In a preferred embodiment of the invention, a smart-card configuration emulates a wireless telephone system of a type that uses handsets that communicate with base stations. The computers serve as base stations and the smart-cards serve as headsets. In a preferred embodiment of the invention, the smart-card includes a microphone array so that the card can detect the mouth location and focus the reception on the speaker, as known in the art of microphone arrays. Alternatively, dedicated headsets (or handsets) may be provided. In a preferred embodiment of the invention, an office telephone or computer network can serve as a local cellular network for communication, by keeping track which base-stations are in communication with which handsets and by providing the ability for a base station to locate handsets (for example as described herein) and for a handset to change base stations.

Wireless Input for Smart-Card

In a preferred embodiment of the invention, the smart includes means for receiving non-acoustic input. The means may be mounted on the smart-card, for example a bar-code reader as described with reference to FIG. 3E or it may be a separate input device that communicates with the smart-card. A simplest example is a wireless bar-code reader that reads bar codes and transmits them acoustically to the smart-card, preferably using methods as described herein. Alternatively, the bar-code reading capability is embodied in the smart-card, so that a multifunction device is provided. Alternatively, a miniature device, such a ring, is manufactured, for convenience or a user. Such a device may be useful during purchasing (described herein), to allow a user to review large and/or personalized information regarding a product. Another example is a magnetic strip reader which transmits read magnetic strips to a smart-card, through the smart-card to a computer, or directly to a computer. In the case of a magnetic strip reader, a single magnetic sensor (or line sensor) on the smart-card or on the input device may be sufficient, with the computer processing the detected signals to correct for non-constant motion of the sensor over the magnetic material.

In one exemplary use, when the smart-card reads a tag, such as a make of a device, an associated computer switches to a WWW page (possibly remotely provided) which displays details associated with the read information and/or with suitable promotional material. The computer may be a handheld computer or PDA. Alternatively, the computer is a standing or store-provided computer. Alternatively, the computer is on another side of a telephone line, and acoustic signals are transmitted over the telephone line to the computer, to cause certain speech to be transmitted back. Alternatively or additionally, such tags may be used for technical support (e.g., each home device or component has such a code and there is a help file or scripts associated with the code). Alternatively or additionally, such tags may be used for customer relations, for example to provide information to an interested user. In some types of products, the computer and/or the tag reader can control the product using information read for the tag. An exemplary situation is a computer device, on which a tag reader or a same or second computer can execute a diagnostic program responsive to the read tag.

An exemplary input device consists of an acoustical transmitter, a tag-reading element, and some control logic. The type of tag reading element used depends on the type of tag, for example, if it is optical or magnetic. The tag itself may include bar codes, other optical coding or even text. In a magnetic example, the tag may comprise magnetic ink. Preferably, but not essentially, the tags are of a type that can be printed using standard printers and/or inks. Thus, tags can be printed all over a book, magazine or other printed products. Alternatively or additionally, RF transponder tags as known in the art may be used. In some embodiments, the read information is deciphered by the smart-card. In other embodiments, partially or completely unanalyzed information is transmitted by the card to the computer for analysis.

Although an acoustic transmission of the tag information is preferred especially using the same transponders as used by the smart-card for other uses described herein, RF transmission may also be practiced.

Alternatively or additionally, the smart-card may utilize its acoustic transponders to determine the relative position (one-two- or three-dimensions and/or orientations) and/or distance of an input device. Exemplary input devices include passive sound sources, such as a metal object which makes a sound when striking a surface, piezoelectric materials which generate an acoustic wave when activated by RF radiation and active sources, such as a battery powered device, which sends an acoustic signal when pressure is applied to it. These devices may be handheld or they may be worn on a finger as a ring or a thimble.

In an exemplary use, such an input device may be used to control a smart-card or enter information thereto using gestures or by tapping on a virtual keyboard space. In another exemplary use, by providing acoustic devices on a plurality of fingers, some ASL (American Sign Language) gestures can be inputted into the smart-card. In a preferred embodiment of the invention, the smart-card learns or can be personalized to recognize a users particular gestures and/or gesture patterns, as gesticulation is usually less uniform among users than handwriting, which is taught in standardized schools using standardized texts.

Use of Card for Arcade Games

In another example of the use of smart-cards, an acoustic smart-card is used to operate arcade games. Such a card may utilize the speaker and/or microphone of the game. In a preferred embodiment of the invention, the card includes information about the user, for example for billing. Alternatively or additionally, the information may include gaming information, for example how far in the game the player is or the player's level, so the arcade game can be suitably configured.

Variation of Smart-Card Form

In some preferred embodiments of the invention, the smart-card functionality described herein is embodied in a form other than that of a credit card, for example as a key-fob, a ring, a watch or a pen. It should be appreciated that as the card is not required to be inserted into a reader, many different forms, with a same smart-card functionality, can be implemented.

Alternatively or additionally, the card may have a removable casing, so that the card can be decorated using bright plastic pieces. Alternatively or additionally, sheet stickers may be provided for sticking on the card for enhancing its aesthetic appeal. Possibly, the added components are active components, such as LCDs or LEDs, which can be powered by the card. Preferably, the added components are made so they do not interfere with data and/or signal input into the card or output from the card. Alternatively or additionally, the added components add functionality or range to the card, such as by providing a more sensitive antenna, a larger battery or a power input.

Emulation of a Smart-Card

As many electronic devices include a speaker and/or a microphone, an acoustic smart-card may communicate with any such device that has suitable software. Due to the decreasing size of electronics, in some cases, a smart-card may be emulated using a PDA or other electronic means (or vice-versa), with regard to both size and functionality. Additionally or alternatively, such smart-card functionality may be exhibited by a cellular telephone or a laptop computer. A benefit of a laptop computer and of a PDA is their convenient user-interface. A benefit of a cellular telephone is the possibility of real-time and/or off-line communication with a central location.

An advantage of dedicated smart-card devices (in any physical form), as opposed to multi-function devices that emulate smart cards, is that dedicated smart cards require less circuitry than general purpose devices (such as PDAs) and, paradoxically, they are simpler to use as they have fewer functions. This simplicity of use may be enhanced by the availability of a limited variety of display and input options.

Although the present disclosure has focused on acoustic smart-cards, many of the features described herein may be applied to non-acoustic contact or contact-less smart-cards or to credit cards and/or portable electronic devices, in accordance with preferred embodiments of the invention.

This patent application describes different applications and usage ideas, beneficial to the user, portal and/or vendor, and which optionally utilize novel business models as described herein. Although mainly methods are described, the present invention is also directed towards software for performing these methods and computers programmed with such software. In addition, a plurality of features are described. Different embodiments of the invention may utilize different selections of these features and the following description is not meant to limit the groupings of features but, rather, to illustrate certain preferred groupings.

The present invention has been described in terms of preferred, non-limiting embodiments thereof. It should be understood that features described with respect to one embodiment may be used with other embodiments and that not all embodiments of the invention have all of the features shown in a particular figure. In particular, the scope of the claimed invention is not limited by the preferred embodiments but by the following claims. In some embodiments only methods have been described, the scope of some embodiments of the invention is intended to encompass also hardware and/or software implementations of these methods. Section titles, where they appear, are not to be construed in limiting subject matter described therein, rather section titles are meant only as an aid in browsing this specification. When used in the following claims, the terms "comprises", "comprising", "includes", "including" or the like mean "including but not limited to".

The invention claimed is:

1. A method of interfacing a smart card and an electronic device, said method comprising:
    providing a smart card having:
        (a) a magnetic memory strip;
        (b) an acoustic transduction element;
        (c) an acoustic antenna configured to transmit an acoustic signal generated by the acoustic transduction element; and
        (d) a processor configured to use information stored on the magnetic memory strip and control the acoustic transduction element to generate the acoustic signal;
    providing the electronic device having at least one of a microphone and a speaker configured to be used as an input device;
    converting, by the processor, data stored on the magnetic memory strip to the acoustic signal;
    transmitting the acoustic signal via the acoustic antenna to the electronic device via a microphone input at the electronic device;
    transmitting a signal by the electronic device to a remote server;
    transmitting programming data by the remote server to the electronic device; and
    transmitting the acoustic signal including the programming data from the electronic device to a second device.

2. The method according to claim 1 further comprising, before said converting, swiping the smart card at the input device.

3. The method according to claim 1, wherein said acoustic signal includes encoded data, said method further comprising:
    transmitting a signal containing the encoded data by the electronic device to a remote server; and
    at least one of authenticating a user of the smart card and authorizing use of the smart card by the remote server.

4. The method according to claim 1, wherein said acoustic signal includes first encoded data, said method further comprising:
    transmitting a signal containing the first encoded data by the electronic device to a remote server; and
    transmitting second encoded data to the electronic device by the remote server; and
    downloading the second encoded data to the smart card.

5. The method according to claim 1, wherein said transmitting is performed using one of a microphone line and the microphone as one of a sonic, ultrasonic, and non-acoustic antenna.

6. A method of interfacing a smart card and an electronic device, said method comprising:
    providing a smart card, wherein the smart card includes: (a) data readable by a magnetic-field sensitive sensor, (b) a magnetic field generating unit, and (c) an antenna configured to transmit data from the magnetic field generating unit to an electronic device;
    selecting data from the smart card to be made available to be read; and
    transmitting magnetic signals read to the electronic device by the magnetic reader via the antenna.

7. The method according to claim 6, wherein the magnetic reader is provided on the smart card.

8. A method of interfacing a smart card and an electronic device, said method comprising:
    providing the smart card, wherein the smart card (a) includes data readable by a magnetic reader, (b) is one of an RF and a magnetic field generating unit configured to transmit data to the electronic device via one of a read/ write head and a cable, and (c) is coupled by the cable to the electronic device, the smart card including an antenna for transmitting data to the cable;

selecting by a user specific data from the smart card to be made available to be read;

transmitting magnetic signals read to the electronic device by the magnetic reader.

9. The method according to claim 8, wherein the antenna is configured to transmit data by any of: surrounding the cable, piercing the cable, being placed in proximity to the cable, and being placed inside a device casing of the cable, thereby allowing for transmitting data from the smart card to the electronic device.

10. The method according to claim 8, wherein the specific data is transmitted directly from the smart card to a second smart card.

11. The method according to claim 8, wherein the specific data is transmitted from the smart card to a second smart card via a mediating computer.

12. A method of interfacing a smart card and an electronic device, said method comprising:

providing the smart card, wherein the smart card includes data readable by a magnetic reader;

selecting by a user specific data from the smart card to be made available to be read;

transmitting magnetic signals read to the electronic device by the magnetic reader;

interfacing at least a second smart card with the electronic device, said method including assigning to the smart card one or more accessing slots corresponding to one of: time division coding slots, and frequency division coding slots, to avoid collisions to the smart card.

* * * * *